(12) United States Patent  
Dvorak et al.

(10) Patent No.: US 8,613,061 B2
(45) Date of Patent: Dec. 17, 2013

(54) METHODS AND APPARATUS TO IMPLEMENT ELECTRONIC BOOK VIEWERS

(75) Inventors: Joseph Dvorak, Hampshire, IL (US); Alexander Hirsch, Highland Park, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 374 days.

(21) Appl. No.: 12/873,994

(22) Filed: Sep. 1, 2010

(65) Prior Publication Data

US 2012/0054822 A1    Mar. 1, 2012

(51) Int. Cl.
*G06F 17/30* (2006.01)

(52) U.S. Cl.
USPC ............... 726/5; 713/165; 380/282; 709/205; 709/219; 709/224

(58) Field of Classification Search
None
See application file for complete search history.

(56) References Cited

U.S. PATENT DOCUMENTS

| | | | |
|---|---|---|---|
| 5,128,662 A | 7/1992 | Failla | |
| 5,847,698 A | 12/1998 | Reavey et al. | |
| 6,229,502 B1 | 5/2001 | Schwab | |
| 6,512,497 B1 | 1/2003 | Kondo et al. | |
| 6,532,146 B1 | 3/2003 | Duquette | |
| 6,628,244 B1 | 9/2003 | Hirosawa et al. | |
| 6,643,124 B1 | 11/2003 | Wilk | |
| 6,704,733 B2 | 3/2004 | Clark et al. | |
| 6,819,304 B2 | 11/2004 | Branson | |
| 6,891,953 B1 | 5/2005 | DeMello et al. | |
| 6,996,720 B1 | 2/2006 | DeMello et al. | |
| 7,091,926 B2 | 8/2006 | Kulas | |
| 7,092,247 B2 | 8/2006 | Kim | |
| 7,095,387 B2 | 8/2006 | Lee et al. | |
| 7,138,962 B2 | 11/2006 | Koenig | |
| 7,171,692 B1 | 1/2007 | DeMello et al. | |
| 7,355,338 B2 | 4/2008 | Osame et al. | |
| 7,429,108 B2 | 9/2008 | Rosenberg | |
| 7,610,045 B2 | 10/2009 | Little et al. | |
| 7,782,274 B2 | 8/2010 | Manning | |

(Continued)

FOREIGN PATENT DOCUMENTS

CN 1356636 7/2002
EP 1 526 445 4/2005

(Continued)

OTHER PUBLICATIONS

"The Asus New Folding E-Book Reader" Sep. 9, 2009, [retrieved from www.physorg.com/news171701964.html] 2 pages.

(Continued)

*Primary Examiner* — Pramila Parthsarathy
(74) *Attorney, Agent, or Firm* — Hanley, Flight and Zimmerman, LLC

(57) ABSTRACT

Example methods and apparatus to implement electronic book viewers are disclosed. A disclosed example method involves presenting content on a display panel removably attachable to a binding element. The binding element is configured to receive one or more other display panels in a removably attached configuration to form an electronic book. The example method also involves enforcing a content protection policy associated with the content presented on the display panel based on an attachment status of the display panel. The attachment status is associated with the removable attachability of the display panel relative to the binding element.

26 Claims, 10 Drawing Sheets

(56) References Cited

U.S. PATENT DOCUMENTS

| | | | |
|---|---|---|---|
| 7,865,567 B1* | 1/2011 | Hendricks et al. | 709/214 |
| 8,018,431 B1* | 9/2011 | Zehr et al. | 345/156 |
| 8,233,863 B2* | 7/2012 | Kim | 455/158.4 |
| 8,300,022 B2 | 10/2012 | Brenneman et al. | |
| 2001/0040560 A1 | 11/2001 | Amron | |
| 2001/0054986 A1 | 12/2001 | Leman | |
| 2002/0005826 A1 | 1/2002 | Pederson | |
| 2002/0021622 A1 | 2/2002 | Baroche | |
| 2002/0081560 A1 | 6/2002 | Ka-Wah | |
| 2002/0128055 A1 | 9/2002 | Adams | |
| 2002/0135535 A1 | 9/2002 | Muller | |
| 2002/0140628 A1 | 10/2002 | Morrone | |
| 2003/0020671 A1 | 1/2003 | Santoro et al. | |
| 2003/0043087 A1 | 3/2003 | Kim | |
| 2003/0071800 A1 | 4/2003 | Vincent et al. | |
| 2003/0071832 A1 | 4/2003 | Branson | |
| 2003/0098857 A1 | 5/2003 | Gettemy et al. | |
| 2003/0109286 A1 | 6/2003 | Hack et al. | |
| 2003/0144034 A1 | 7/2003 | Hack et al. | |
| 2003/0160735 A1 | 8/2003 | Lee et al. | |
| 2003/0160754 A1 | 8/2003 | Hanson et al. | |
| 2003/0161094 A1 | 8/2003 | Chambers | |
| 2003/0218577 A1 | 11/2003 | Wang | |
| 2003/0218712 A1 | 11/2003 | Kumar et al. | |
| 2003/0218860 A1 | 11/2003 | Shiraiwa | |
| 2004/0036810 A1 | 2/2004 | Kim | |
| 2004/0036818 A1 | 2/2004 | Kim et al. | |
| 2004/0150581 A1 | 8/2004 | Westerinen et al. | |
| 2004/0212588 A1 | 10/2004 | Moriyama | |
| 2004/0212602 A1 | 10/2004 | Nako et al. | |
| 2004/0217423 A1 | 11/2004 | Park et al. | |
| 2005/0050367 A1 | 3/2005 | Burger et al. | |
| 2005/0088463 A1 | 4/2005 | Schilling | |
| 2005/0099361 A1 | 5/2005 | Majer | |
| 2005/0134524 A1 | 6/2005 | Parker et al. | |
| 2005/0146845 A1 | 7/2005 | Moscovitch | |
| 2005/0162511 A1 | 7/2005 | Jackson | |
| 2005/0248501 A1 | 11/2005 | Kim | |
| 2005/0285811 A1 | 12/2005 | Kawase et al. | |
| 2006/0044215 A1 | 3/2006 | Brody et al. | |
| 2006/0088359 A1 | 4/2006 | Konieczny et al. | |
| 2006/0126284 A1 | 6/2006 | Moscovitch | |
| 2006/0146488 A1 | 7/2006 | Kimmel | |
| 2006/0232496 A1 | 10/2006 | Sato | |
| 2007/0120762 A1* | 5/2007 | O'Gorman | 345/1.1 |
| 2007/0195009 A1 | 8/2007 | Yamamoto et al. | |
| 2007/0204078 A1 | 8/2007 | Boccon-Gibod et al. | |
| 2007/0279315 A1 | 12/2007 | Laves et al. | |
| 2007/0285341 A1 | 12/2007 | Manning | |
| 2009/0091512 A1* | 4/2009 | Jung et al. | 345/1.1 |
| 2009/0138402 A1 | 5/2009 | Chan et al. | |
| 2009/0241054 A1 | 9/2009 | Hendricks | |
| 2010/0085274 A1 | 4/2010 | Kolpatrick et al. | |
| 2011/0157063 A1 | 6/2011 | Yamamoto et al. | |
| 2012/0200487 A1 | 8/2012 | Dvorak et al. | |

FOREIGN PATENT DOCUMENTS

| | | |
|---|---|---|
| JP | 2000020534 | 1/2000 |
| WO | 01/90928 | 11/2001 |
| WO | 2007/144549 | 12/2007 |

OTHER PUBLICATIONS

Ken Hinckley, "Sensing Techniques for Multi-Device Interfaces," Microsoft Research, CHI International Conference, Apr. 2006, Montreal, Canada, 4 pages.

"Research Disclosure: Mobile Swarm," Research Disclosure Database No. 555056, Jul. 2010, Kenneth Mason Publications, Ltd., 7 pages.

Chen et al., "Navigation Techniques for Dual-Display E-Book Readers," CHI 2008, Apr. 5-10, Florence, Italy, 10 pages.

Amazon, "AmazonKindle User's Guide," White Paper, May 28, 2010, XP002619715, 100 pages.

European Patent Office, "Extended European Search Report," issued in connection with European Patent Application No. 10174851.5 on Feb. 18, 2011, 7 pages.

European Patent Office, "Exam Report," issued in connection with European Patent Application No. 10174851.5 on Jan. 9, 2013, 6 pages.

Canadian Intellectual Property Office, "Examination Report," issued in connection with Canadian Patent Application No. 2,751,289, on Jul. 19, 2013, 3 pages.

* cited by examiner

METHODS AND APPARATUS TO IMPLEMENT ELECTRONIC BOOK VIEWERS

FIELD OF THE DISCLOSURE

The present disclosure relates generally to mobile media devices and, more particularly, to methods and apparatus to implement electronic book viewers.

BACKGROUND

Electronic books (e-books) are typically digital publications that may be stored in and displayed via different types of electronic devices including stationary and portable devices. Some known e-book readers are software applications installed in processor systems such as computers or portable devices, while other e-book readers are dedicated devices that provide functionality specifically tailored for reading published works in electronic format. Some known portable electronic devices for displaying e-books are e-book readers, personal digital assistants, and smart phones. Acquiring e-books may involve purchasing and downloading from an online store or purchasing e-books stored on a removable storage medium.

DETAILED DESCRIPTION

Figure 1:
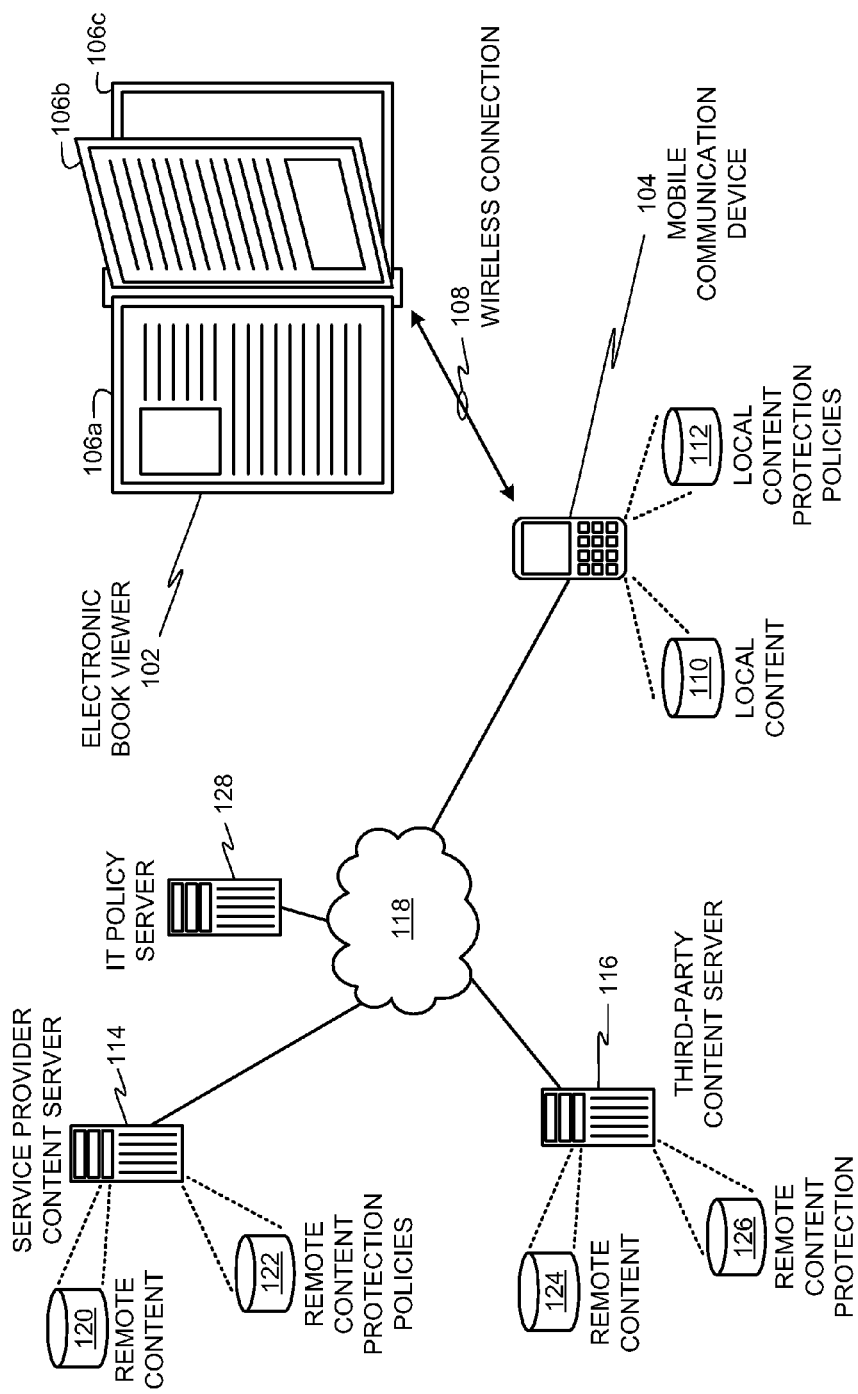
FIG. 1 depicts an example electronic book viewer shown with a mobile communication device and local and remote content data stores.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The example methods and apparatus described herein may be used to implement electronic book viewers to display content including electronically published/stored books, electronically stored documents, web-based content, and/or any other content. In some example implementations, an electronic book viewer implemented in accordance with the example methods and apparatus disclosed herein may be a multi-page electronic book viewer including two or more display panels, which may be single-sided or dual-sided display panels. In some example implementations, the multi-page electronic book viewer may be adapted to include removably attachable display panels to facilitate after-market re-configurations thereof by adding additional display panels thereto and/or removing display panels therefrom. In addition, some example display panels may be configured to be physically interchanged or shared between two or more multi-page electronic book viewers. Such physically interchangeable display panels may be used to facilitate sharing content between different electronic book viewers.

The example electronic book viewers disclosed herein may be configured to display unprotected content (e.g., open content) and protected content. Protected content may include content protected from undesired or impermissible distribution or accessibility. Some content may be protected from being displayed on some electronic book viewers (or to particular users or types of users), while not being protected from displaying on other electronic book viewers (or to particular users or types of users). To protect the distribution or accessibility of such content, the example methods and apparatus disclosed herein may be used to create, store, access, and/or enforce content protection policies. Such content protection policies may be pre-defined or commercially available protection policies or end-user-created protection policies. Pre-defined protection policies may be created by, for example, content publishers prior to publishing electronically presentable content (e.g., electronic books, web content, and/or other media). End-user-created protection policies may be created by, for example, end users of electronic book viewers or other individual persons that generate documents or supplemental information to pre-existing documents and desire to protect their documents or supplemental information from access by persons other than those for which permissions are specifically granted.

The example methods and apparatus disclosed herein may be used to enforce content protection policies using one or more content protection enforcement techniques. For example, some content protection techniques may involve conditional transmission/reception of content between two or more electronic book viewers depending on protection policies of content and permissions associated with target recipients. Other example content protection techniques may be based on capabilities of display panels to be removably attachable to separate electronic book viewers by conditionally presenting content based on an attachment status of a display panel to an electronic book viewer. Such content protection techniques and others disclosed herein may be used in connection with an electronic document or published work in its entirety or in piecemeal fashion on portions (e.g., individual pages) of such documents or published works.

In addition, for user-authored works that are supplemental to pre-existing authored works, the example methods and apparatus disclosed herein enable enforcing user-created content protection policies for such user-authored works separately from content protection policies of the pre-existing authored works. For example, pre-existing authored works may include electronically published books, official documents (e.g., medical records, legal documents, etc.), etc., and user-authored works may be user-created documents or messages, user notes, comments, and/or markups created by an end user regarding the content of the pre-existing authored works. Content protection policies for a pre-existing authored work may be relatively more open than user-created content protection policies for user-authored notes or supplemental information regarding the content of such pre-existing authored work. Thus, the example methods and apparatus disclosed herein may be used to allow sharing the original pre-existing authored work with others while hiding or protecting the corresponding user-authored works from viewing by non-authorized or non-permitted persons.

In some example implementations, the example methods and apparatus described herein may be used in connection with mobile communication devices, mobile computing devices, or any other device capable of communicating wirelessly with a wireless network. Such devices, also referred to as terminals, wireless terminals, or user equipment (UE), may include mobile smart phones (e.g., a BlackBerry® smart phone), wireless personal digital assistants (PDA), laptop/notebook/netbook computers with wireless adapters, etc.

FIG. 1 depicts an example electronic book viewer 102 shown with a mobile device 104 (e.g., a mobile communication device) and local and remote content data stores. In the illustrated example, the electronic book viewer 102 includes removably attachable display panels 106*a-c* configured to turn like pages of a book. As described in greater detail below, each of the removably attachable display panels 106*a-c* may be removed from the electronic book viewer 102 and operate as a stand-alone display in an unattached mode (e.g., a tablet mode). In addition, each of the removably attachable display panels 106*a-c* may be attached to other electronic book viewers (e.g., an electronic book viewer 202 of FIG. 2) to, for example, share content between different users.

In the illustrated example of FIG. 1, the electronic book viewer 102 is shown in communication with the mobile device 104 via a wireless communication connection 108 (e.g., a Bluetooth® connection, a WiFi connection, etc.) and is configured to exchange content and content protection policies with the mobile device 104. In the illustrated example, the mobile device 104 is a content and content protection policy host for the electronic book viewer 102. For example, as shown in FIG. 1, the mobile device 104 may include a local content data store 110 and a local content protection policy data store 112. In the illustrated example, the electronic book viewer 102 is configured to present media (e.g., text, graphics, video, audio, etc.) stored in and/or retrieved from the local content data store 110 of the mobile device 104. In some example implementations, the electronic book viewer 102 may also be configured to operate as an external display for the mobile device 104 to present content ordinarily presented on a display of the mobile device 104 (e.g., mobile device applications, emails, address book entries, etc.). In other example implementations, the electronic book viewer 102 may operate in connection with other types of hosts other than the mobile device 104. Such other hosts may be any other type of processor systems including computers, personal digital assistants (PDAs), servers, etc.

The local content data store 110 may store pre-existing and/or published authored works (e.g., e-books, official documents, webpage content, etc.) or user-authored works (e.g., user-created documents, user-created media, emails, calendar appointments, supplemental notes, markups, comments, etc.). The local content protection policy data store 112 may store content protection policies for the content stored in the local content data store 110. Although the local content protection policy data store 112 is shown separate from the local content data store 110, in some example implementations, content protection policies and corresponding content may be stored together in the same data store. For example, a file or database storing content may also store the protection policies corresponding to that content.

In the illustrated example of FIG. 1, the mobile device 104 may be implemented using a mobile/cellular phone, a smart phone, or any other personal communication device and may be configured to communicate with network entities such as remote content servers 114 and 116 via a network 118 (e.g., the Internet, an intranet, a local area network (LAN), etc.) to retrieve content and/or content protection policies. As described above, the mobile device 104 may operate as a host device to serve content and content protection policies to the electronic book viewer 102. In addition, the mobile device 104 may operate as an authorizing device that analyzes content protection policies and authorizes the electronic book viewer 102 to present content in accordance with such protection policies. In some example implementations, the electronic book viewer 102 and the mobile device 104 may share enforcement responsibilities of content protection policies.

In the illustrated example, the content server 114 is a service provider content server (e.g., a content server owned and/or operated by a communication service provider servicing and maintaining a subscription for the mobile device 104) and includes a remote content data store 120 and a remote content protection policy data store 122. The content server 116 is a third-party content server (e.g., a content server that stores and serves electronic books or other media electronically published and distributed by a media content provider) and includes a remote content data store 124 and a remote content protection policy data store 126.

In some example implementations, the mobile device 104 may operate as a proxy or intermediate communication device between the electronic book viewer 102 and the remote content data stores 120 and 124. For example, the mobile device 104 may retrieve content from the remote content data stores 120 and 124 and store the retrieved content in its local content data store 110 for presentation via the electronic book viewer 102. Additionally or alternatively, network-stored content is not stored locally in the local content data store 110 but is instead streamed to the electronic book viewer 102. Content retrieval may or may not be based on a content subscription.

In the illustrated example, the local content data store 110 and the remote content data stores 120 and 124 may store protected content and unprotected content (e.g., open content). To display protected content, the electronic book viewer 102 is configured to receive and enforce corresponding content protection policies from the local content protection policy data store 112 and/or the remote content protection policy data stores 122 and 126. In some example implementations, the mobile device 104 may process the content protection policies and instruct the electronic book viewer 102 regarding the manner in which to enforce such protection policies.

In some example implementations, content protection policies stored in the content protection policy data stores 112, 122, and 126 may be implemented in accordance with digital rights management (DRM) standards, guidelines, or formats to protect or control access to, for example, authored works that are electronically published and commercially available to any consumer. Content protection policies may also be implemented in accordance with enterprise digital rights management (E-DRM or ERM) standards to protect or control access to corporate documents or other non-public documents (e.g., user-authored works, personal works, medical records, legal documents, etc.). In some example implementations, content protection policies may be user-created and enforced in accordance with user-specified rules. Each pre-defined or user-created content protection policy may include different rules, provisions, or restrictions associated with different modes or operating scenarios of the electronic book viewer 102 or removably attachable display panels 106a-c of the electronic book viewer 102. Such modes or scenarios may include attachment statuses of the removably attachable display panels 106a-c to the binding element 206, proximity of the electronic book viewer 102 to the mobile device 104, a connection between the electronic book viewer 102 and a service provider information technology (IT) policy server 128, a connection between the mobile device 104 and the service provider IT policy server 128, permissions in the service provider IT policy server 128 for the electronic book viewer 102 and/or the mobile device 104, content expiration times, etc.

Content protection policies may be implemented based on different types of protection conditions including conditions associated with a unique identifier of the electronic book viewer 102 and/or the mobile device 104, proximity of the electronic book viewer 102 to the mobile device 104, connection status of the mobile device 104 or the electronic book viewer 102 with a service provider network, date/time, duration, attachment statuses of the removably attachable display panels 106a-c relative to the electronic book viewer 102, and/or any other types of conditions.

For content protection policies based on a unique identifier of the electronic book viewer 102 and/or the mobile device 104, the electronic book viewer 102 may present content so long as a unique identifier of the electronic book viewer 102 and/or the mobile device 104 matches a unique identifier stored in association with a corresponding protection policy of the content. For content protection policies based on the proximity of the electronic book viewer 102 to the mobile device 104, the electronic book viewer 102 may present protected content so long as it is within wireless communication range of the mobile device 104 and/or connected to a service provider network via the mobile device 104. That is, when the electronic book viewer 102 is no longer within communication range of the mobile device 104, the electronic book viewer 102 may be configured to cease presentation of the protected content. For content protection policies based on date/time and/or duration, the electronic book viewer 102 may be configured to present protected content until an expiration date/time has been reached and/or so long as an assigned duration has not expired. As described in detail below in connection with FIG. 2, for content protection policies based on attachment statuses of the removably attachable display panels 106a-c relative to the electronic book viewer 102 and/or other electronic book viewers (e.g., an electronic book viewer 202 of FIG. 2), each display panel 106a-c may individually enforce content protection policies based on whether it is operating in an attached mode with a "home" electronic book viewer (e.g., the electronic book viewer 102) and/or with a "visiting" electronic book viewer (e.g., an electronic book viewer 202 of FIG. 2) and based on whether they are operating in a detached-panel mode (or tablet mode).

In the illustrated example, the service provider information technology (IT) policy server 128 is in communication with the network 118 and stores service subscription terms for mobile communication devices (e.g., the mobile device 104) and/or electronic book viewers (e.g., the electronic book viewer 102). Such service subscription terms indicate the types of services that are available or allowable to different subscribers based on, for example, subscriber contracts, per-use payments, service packages, etc. In some example implementations, the mobile device 104 and/or the electronic book viewer 102 may register with the IT policy server 128 to receive authorization from the IT policy server 128 to present content on the electronic book viewer 102. In some instances, authorization from the IT policy server 128 may be conditional such that only certain types of content or particular content is authorized or permissible for displaying on the electronic book viewer 102. In addition, policies from the IT policy server 128 may also indicate that the electronic book viewer 102 and/or the mobile device 104 hosting the electronic book viewer 102 must be in communication with the IT policy server 128 or other network entity of a service provider associated with the IT policy server 128 in order to present content on the electronic book viewer 102.

Figure 2:
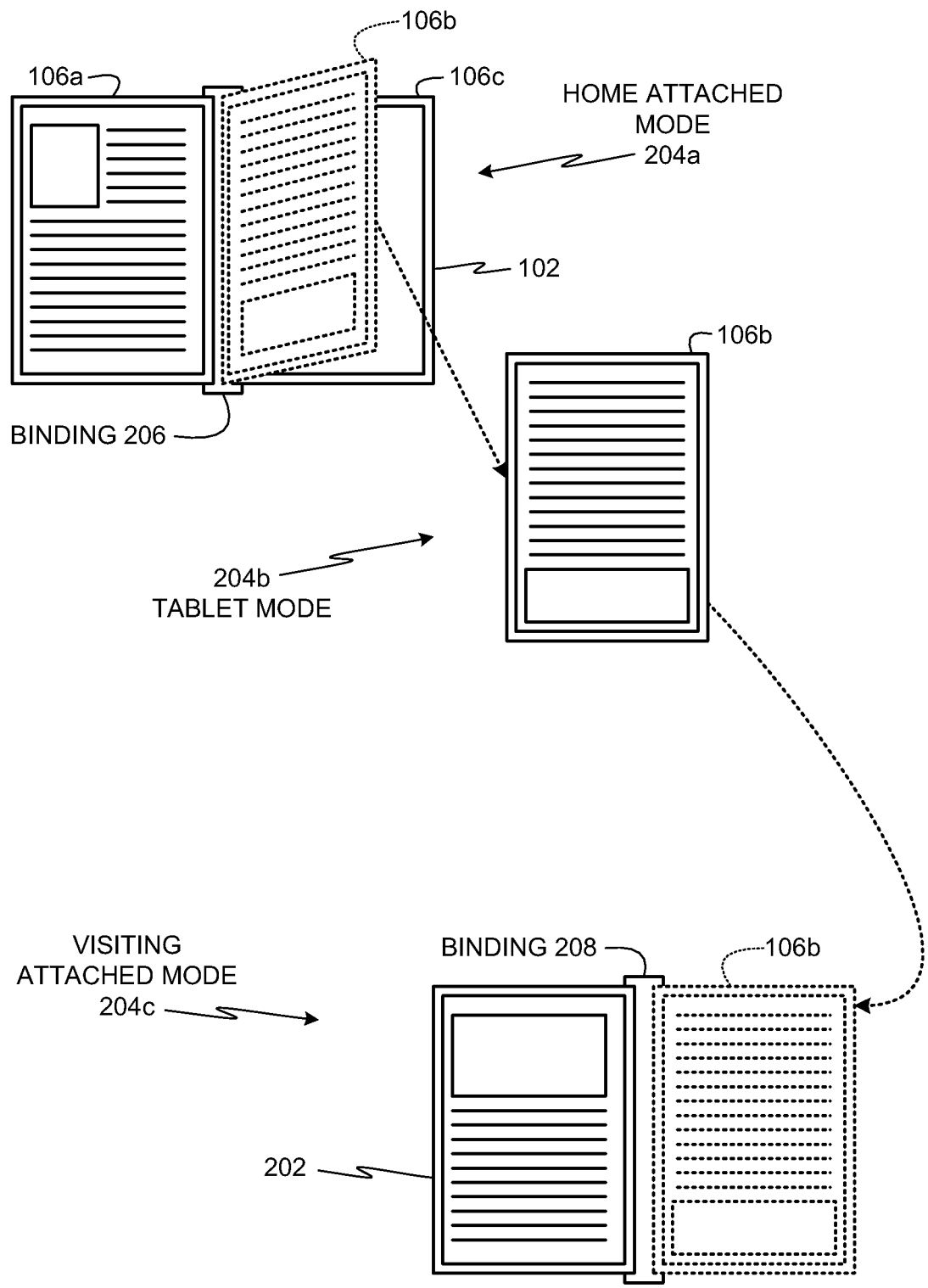
FIG. 2 depicts an example removably attachable display panel configured to operate in multiple modes and interchangeable for sharing between the example electronic book viewer of FIG. 1 and another example electronic book viewer.

Turning to FIG. 2, a removably attachable display panel 106b of the electronic book viewer 102 is shown in three operating configurations relative to the electronic book viewer 102 (e.g., a "home" electronic book viewer) and an electronic book viewer 202 (e.g., a "visiting" electronic book viewer). The three operating configurations include a home attached mode configuration 204a, a tablet mode configuration 204b (e.g., a detached mode), and a visiting attached mode configuration 204c. In the home attached mode configuration 204a, the removably attachable display panel 106b is physically attached to a binding 206 (e.g., a binding element) of the electronic book viewer 102 (e.g., a home electronic book viewer). As discussed in detail below in connection with FIG. 3, the binding 206 includes a processor system to enable obtaining and presenting content via the electronic book viewer 102.

In the home attached mode configuration 204a, the removably attachable display panel 106b may be configured to operate in combination with the other display panels (e.g., the removably attachable display panels 106a and 106c) of the electronic book viewer 102 such that, for example, the removably attachable display panels 106a-c simulate physical pages of a traditional book.

In the tablet mode configuration 204b, the removably attachable display panel 106b is physically detached from the electronic book viewer 102 and operates in a stand-alone configuration. In the tablet mode configuration 204b, the removably attachable display panel 106b may be configured to present content in different manners depending on the hardware implementation of the removably attachable display panel 106b. For example, the removably attachable display panel 106b may be provided with sufficient memory to store (e.g., to cache) and render a single page of content (for a single-sided display panel) or store and render two pages of content (for a dual-sided display panel). In such example implementations, the removably attachable display panel 106b may be configured to present only the content (or a portion of the content) that was last rendered when attached to an electronic book viewer (e.g., one of the electronic book viewers 102 and 202). In other example implementations, the removably attachable display panel 106b may be provided with sufficient memory to store multiple pages of content (or entire authored works) and a local processor to present such content independent of an electronic book viewer. In yet other example implementations, the removably attachable display panel 106b may instead be configured to keep content rendered on a display (e.g., through bi-stable ink technology or through display refresh techniques without having to locally cache the content).

In the visiting attached mode configuration 204c, the removably attachable display panel 106b is physically attached to a binding 208 (e.g., a binding element) of the electronic book viewer 202 (e.g., a "visiting" electronic book viewer). The visiting attached mode configuration 204c may be used to share content from the electronic book viewer 102 with the electronic book viewer 202. In the illustrated example, the removably attachable display panel 106b is configured to communicate with processing logic in the binding 208 when in the visiting attached mode configuration 204c. In this manner, the removably attachable display panel 106b may transfer content and/or content protection policies to the binding 208 and/or receive content and/or content protection policies from the binding 208.

In some example implementations, the removably attachable display panel 106b may be configured to present content in the different mode configurations 204a-c based on content protection policies. For example, a content protection policy may specify different rules, provisions, or restrictions associated with the different modes 204a-c. For example, one rule of a content protection policy may specify that corresponding content may be displayed so long as a removably attachable display panel (e.g., the removably attachable display panel 106b) presenting the content is attached to a "home" electronic book viewer (e.g., the electronic book viewer 102), while a second rule of the same content protection policy may specify that the displayed content (or a portion of the displayed content) must no longer be displayed on the removably attachable display panel or deleted from the removably attachable display panel when it is operating in the tablet mode 204b.

Other content protection policies may specify that corresponding content may be displayed so long as a removably attachable display panel presenting the content is not attached to a 'visited' electronic book viewer (e.g., the electronic book viewer 202), and thus, the content may be presented while the display panel is attached to a "home" electronic book viewer (according to a first rule of a content protection policy) or while operating in a detached or tablet mode (e.g., the tablet mode configuration 204b) (according to a second rule of a content protection policy). In such example implementations, a third rule of a content protection policy specifies that the displayed content must no longer be displayed or must be deleted from the removably attachable display panel when it is operating in the visiting attached mode 204c.

Some content protection policies may specify that corresponding content may be presented on a detached display panel (e.g., in the tablet mode configuration 204b) until the expiration of a specified duration following the detachment of the display panel. Similarly, some content protection policies may specify that corresponding content may be presented on a display panel until the expiration of a specified duration following the attachment of the display panel to a 'visited' electronic book viewer.

Figure 3:
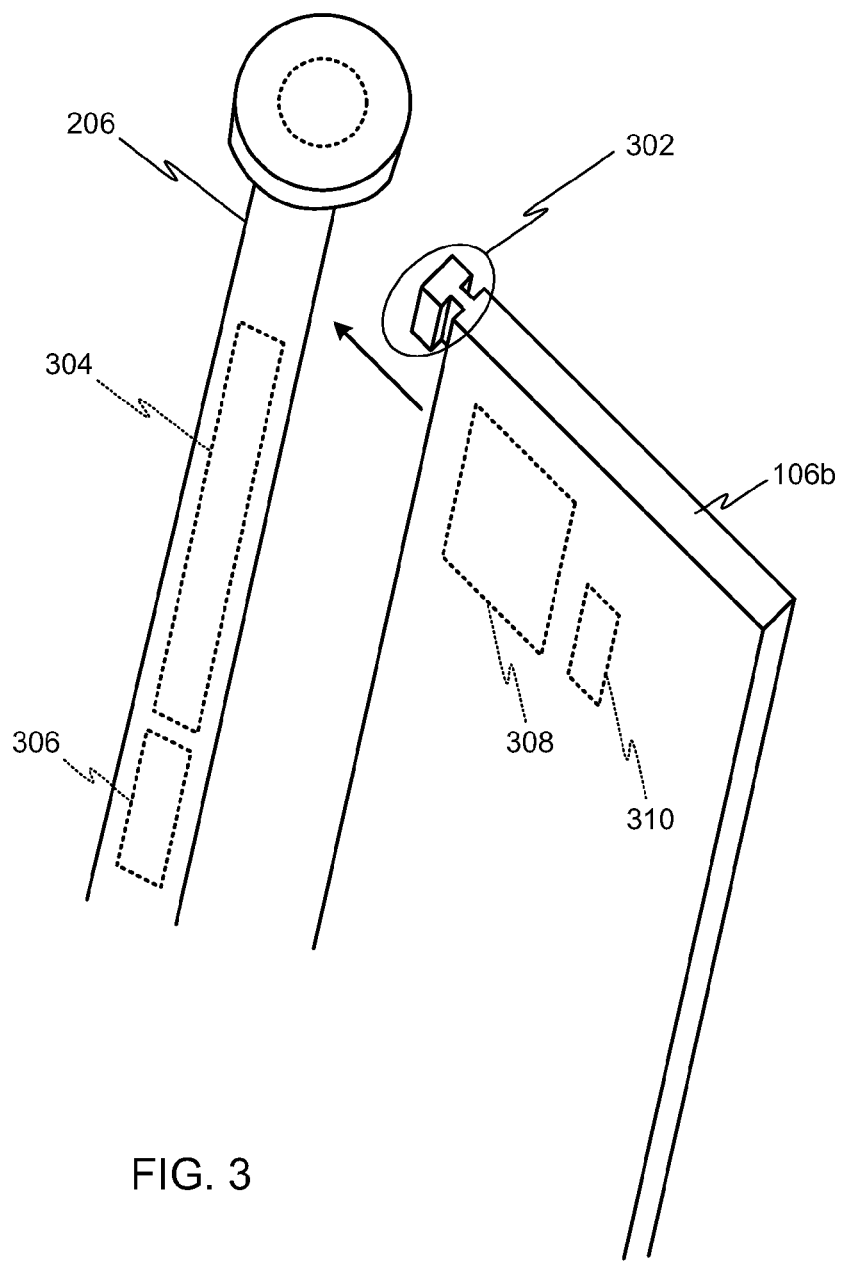
FIG. 3 depicts an example binding element and an example removably attachable display panel of the electronic book viewer of FIGS. 1 and 2.

FIG. 3 depicts the binding 206 and the removably attachable display panel 106b of the electronic book viewer 102 of FIGS. 1 and 2. In the illustrated example, the removably attachable display panel 106b is shown detached from the binding 206 and includes an electro-mechanical connector 302 for mechanically and communicatively attaching and securing the removably attachable display panel 106b to the binding 206. As shown in FIG. 3, the binding element 206 includes a binding processor system 304 that provides the binding element with communication, content storage, and content processing capabilities. The binding processor system 304 may be configured to communicate with the mobile device 104 via the wireless connection 108 of FIG. 1 and communicate with each of the removably attachable display panels 106a-c in a wireless fashion or through a physical connection (e.g., through the electro-mechanical connector 302). The binding 206 is provided with a battery 306 to power the binding processor system 304. In the illustrated example, the battery 306 is rechargeable by connecting the binding 206 with an external power source (e.g., an alternating current (AC) or direct current (DC) power source).

As also shown in FIG. 3, the removably attachable display panel 106b is provided with a display panel subsystem 308. The display panel subsystem 308 may be similar to the binding processor system 304 or may be provided with relatively less or more processing, communication, and/or storage capabilities than the binding processor system 304. The removably attachable display panel 106b is also provided with a battery 310 to power the display panel subsystem 308. In the illustrated example of FIG. 3, the battery 310 may be rechargeable and charged by the battery 306 or an external power source when the removably attachable display panel 106b is attached to the binding 206. An example apparatus that may be used to implement the binding processor system 304 and/or the display panel subsystem 308 is described below in connection with FIG. 9.

Figure 4:
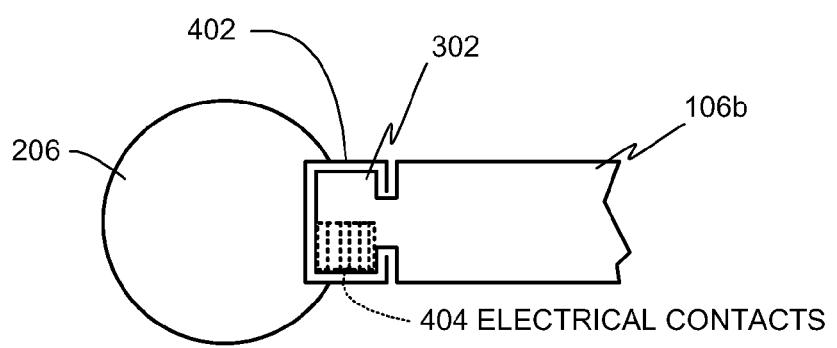
FIG. 4 depicts a plan view of the example binding element and removably attachable display panel of FIG. 3 in an interconnected configuration.

FIG. 4 depicts a plan view of the example binding 206 and the removably attachable display panel 106b of FIGS. 2 and 3 in an interconnected configuration. As shown, the binding 206 is provided with a binding connector 402 to receive the electro-mechanical connector 302 to make mechanical and electrical contact between the removably attachable display panel 106b and the binding 206. Fastening the electro-mechanical connector 302 to the binding connector 402 causes engagement between electrical contacts 404 of the electro-mechanical connector 302 and the binding connector 402. In the illustrated example, the electrical contacts 404 enable communications between the binding 206 and the removably attachable display panel 106b and power transfer from the binding 206 to the removably attachable display panel 106b. In other example implementations, optical contacts may be employed instead of the electrical contacts 404 and/or the electrical contacts 404 may be used in combination with optical contacts.

Although FIGS. 3 and 4 depict the binding 206 as a cylindrical structure, the binding 206 may alternatively be implemented using other structural configurations. In addition, attachment elements for mechanically and communicatively fastening or attaching the removably attachable display panel 106b to the binding 206 may be implemented using fastening or connection structures other than the electro-mechanical connector 302 and the binding connector 402 depicted in FIGS. 3 and 4. In addition, in some example implementations, the binding processor system 304 and the display panel subsystem 308 may communicate with one another via wireless communications such that the removably attachable display panel 106b may communicate with the binding 206 when in an attached mode (e.g., the home attached mode configuration 204a of FIG. 2) or a detached mode (e.g., the tablet mode configuration 204b of FIG. 2).

Figure 5:
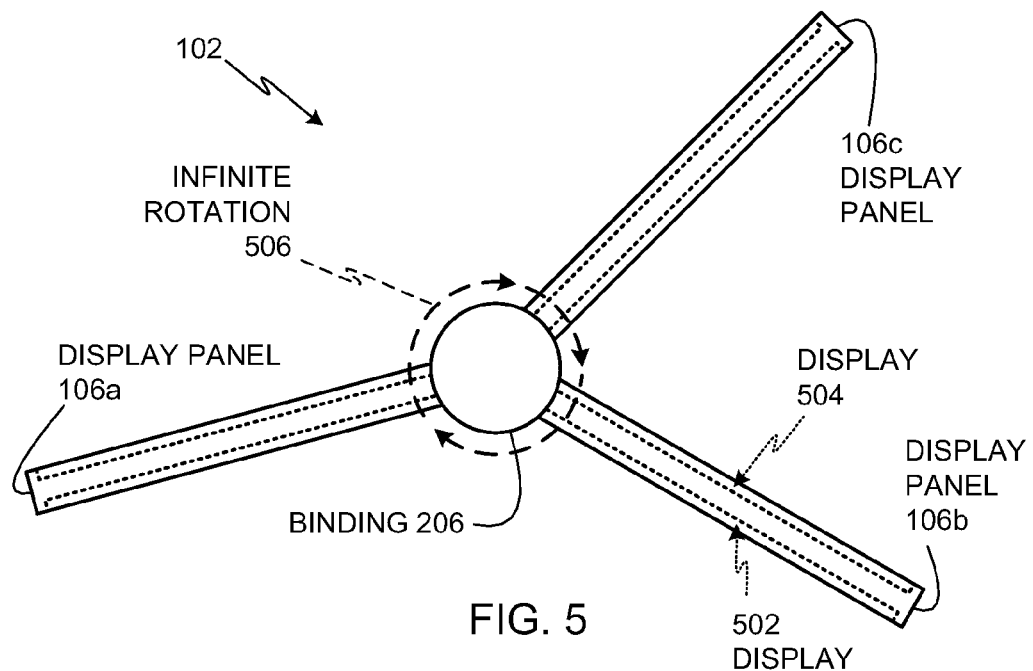
FIG. 5 depicts a plan view of the example electronic book viewer of FIGS. 1 and 2.

FIG. 5 depicts a plan view of the example electronic book viewer 102 of FIGS. 1 and 2. In the illustrated example of FIG. 5, each of the removably attachable display panels 106a-c is implemented as a double-sided display panel having opposing displays. Opposing displays of the display panel 106b are indicated by reference numerals 502 and 504. The opposing displays 502 and 504 enable content to be rendered on both faces of the removably attachable display panel 106b. In this manner, when a user turns the removably attachable display panels 106a-c in a page turning fashion, a sequentially next page in an electronic publication or document can be displayed on a display (e.g., the display 504) opposing the previously viewed display (e.g., the display 502) to simulate a paper-based reading experience.

The displays 502 and 504 may be implemented using any suitable display technology including, for example, e-paper, liquid crystal display (LCD), organic light emitting diode (OLED), etc. To operate using relatively little power, the displays 502 and 504 may preferably, but not necessarily, be implemented using e-paper. In some example implementations the removably attachable display panels 106a-c may additionally be provided with touchscreens overlaid on the displays (e.g., the displays 502 and 504) to enable user input and control of the electronic book viewer 102. Additionally or alternatively, the removably attachable display panels 106a-c and/or the binding 206 may be provided with one or more user interface buttons or keys (not shown) to enable user-input and control of the electronic book viewer 102.

In the illustrated example of FIG. 5, the removably attachable display panels 106a-c are shown in an infinite rotation configuration relative to the binding 206. That is, each of the removably attachable display panels 106a-c is configured to rotate an infinite number of times about the binding 206. Such an infinite rotation configuration may be advantageously used to simulate a reading experience similar to that of traditional paper-based books. For example, the binding 206 may be configured to sense or detect when each of the display panels 106a-c is turned in a page turning manner in, for example, a direction generally indicated by arrows 506. Upon sensing a page turn, the binding 206 may cause the visible displays (e.g., the displays 502 and 504) of the display panels 106a-c to display sequentially next pages of an electronic publication or document. In this manner, users may progress or move through a multi-page publication or document by turning the display panels 106a-c about the binding 206. The infinite rotation capabilities of the display panels 106a-c about the binding 206 provide an infinite number of page turns and, thus, the electronic book viewer 102 may be used to present multi-page publications or documents having any number of pages.

In some example implementations, to sense or detect page turns based on turning of the display panels 106a-c, the binding 206 may be provided with sensors (e.g., rotary encoders or magnetic sensors). Additionally or alternatively, the display panels 106a-c may be provided with sensors to sense movement (e.g., accelerometers) and/or sensors to sense placement relative to one another. In some example implementations, the display panels 106a-c may be provided with magnets and opposing reed switches to detect the positioning of the display panels 106a-c adjacent one another and to detect when the display panels 106a-c are moved away from one another. In some example implementations, the display panels 106a-c may communicate or send turn page messages to the binding 206. The turn page messages may also include the direction of that page turn so that the binding 206 can send next or previous page(s) content to the display panels 106a-c to present to a user as if the user were turning a page of a traditional paper-based book.

Figure 6:
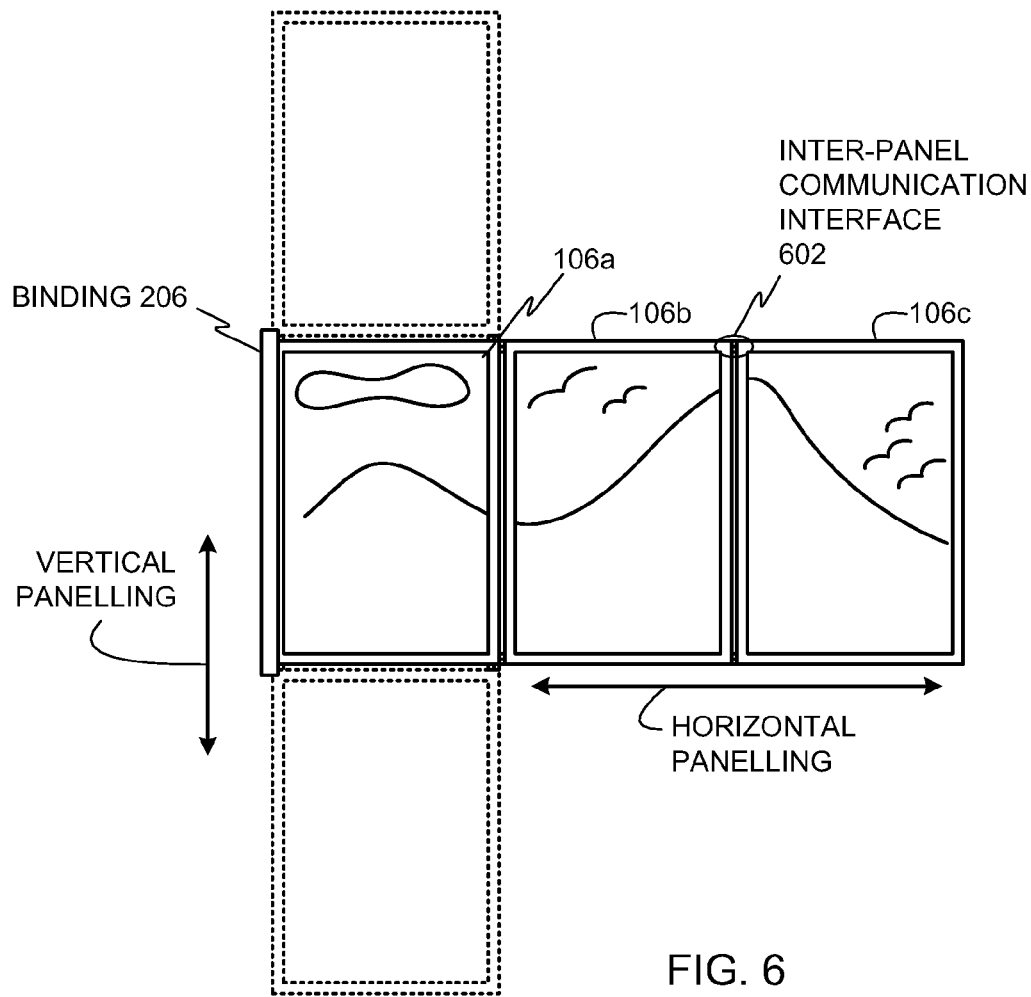
FIG. 6 depicts the example electronic book viewer of FIGS. 1, 2, and 5 in an example paneling configuration.

Turning now to FIG. 6, in some example implementations, the removably attachable display panels 106a-c of the electronic book viewer 102 of FIGS. 1, 2, and 5 may be configured to be arranged in vertical and/or horizontal paneling configurations. In such configurations, the display panels 106a-c form a large continuous display and content may be presented by extending the rendered content across two or more displays of the removably attachable display panels 106a-c. The extended content may be displayed along a horizontal plane or a vertical plane. In the illustrated example, the display panels 106a-c may be provided with inter-connectable inter-panel communication interfaces 602 or connectors to enable mechanically fastening the display panels 106a-c to one another and to provide inter-panel communications to send content and content protection policies to the display panels 106a-c from the binding 206.

Figure 7:
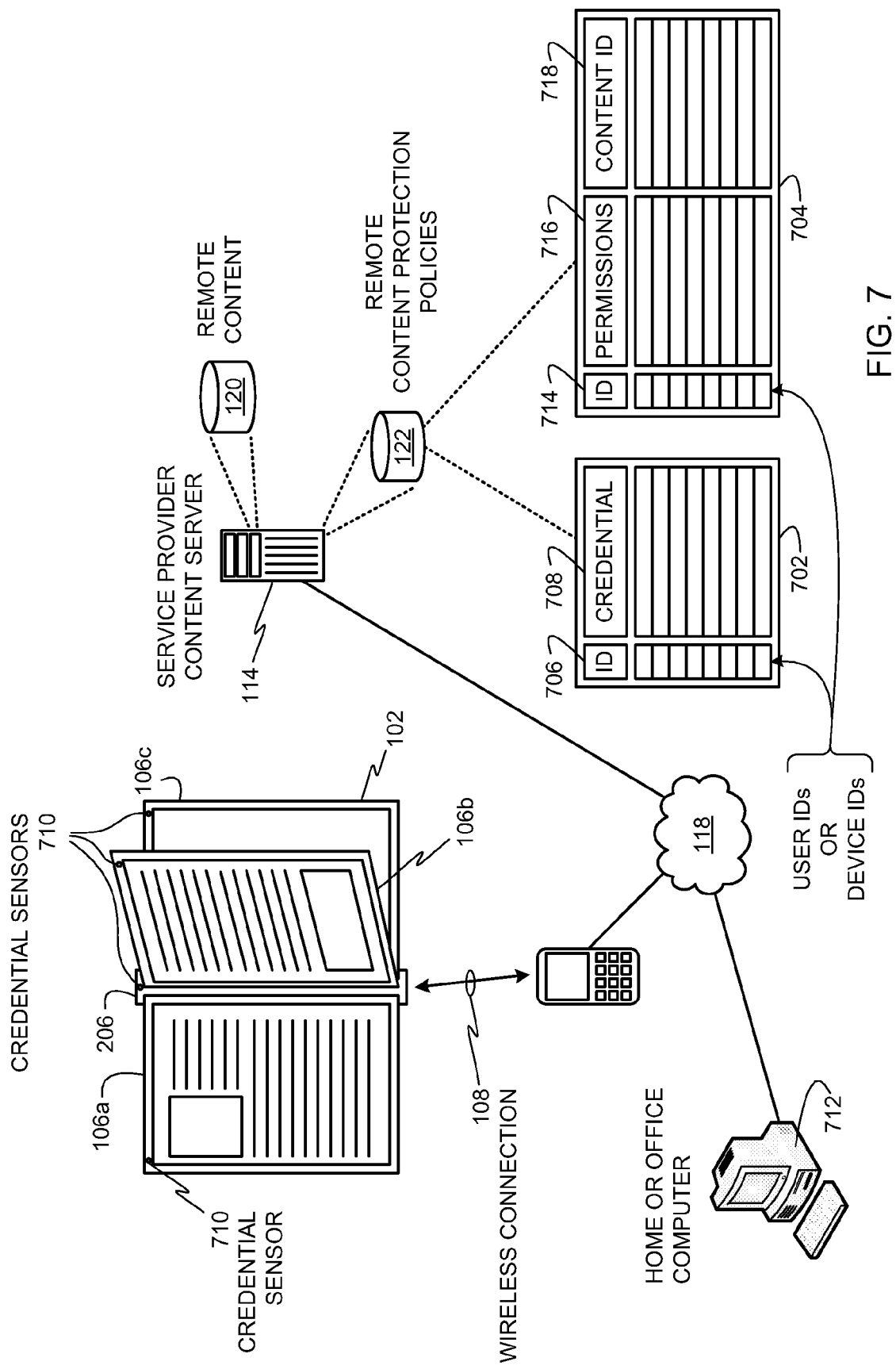
FIG. 7 depicts an example configuration for creating, storing, and accessing content protection policies associated with content presentable on the example electronic book viewer of FIGS. 1, 2, and 5.

FIG. 7 depicts an example configuration for creating, storing, and accessing content protection policies associated with content presentable on the example electronic book viewer 102 of FIGS. 1, 2 and 5. In the illustrated example, the remote content protection policy data store 122 of the service provider content server 114 is shown as storing a credential data structure 702 (e.g., a credential database or table) and a content protection policy data structure 704 (e.g., content protection policy database or table). The credential data structure 702 stores credentials that may be used to verify content access permissions for different users and/or devices (e.g., the mobile device 104 and/or the electronic book viewer 102). The content protection policy data structure 704 stores access control permissions to control access to content for different users and/or devices. Data structures similar or identical to the credential data structure 702 and the content protection policy data structure 704 may also be stored in the local content protection policy data store 112 and/or the remote content protection policy data store 126 of FIG. 1. In addition, the data structures 702 and 704 and their formats are shown merely by way of example. In other example implementations, the information described below as being stored in the data structures 702 and 704 may alternatively be formatted and/or arranged differently.

In the illustrated example of FIG. 7, the credential data structure 702 includes an identifier (ID) column 706 and a credential column 708. In example implementations in which content protection and access control is implemented based on device identifiers, the ID column 706 may store unique identifiers (e.g., electronic serial numbers, media access control (MAC) identifiers, etc.) of electronic book viewers (e.g., the electronic book viewer 102) and/or mobile communication devices (e.g., the mobile device 104). In example implementations in which content protection and access control is implemented based on users, the ID column 706 may store user identification information (e.g., a subscriber ID, a name, etc.).

The credential column 708 stores credential information indicating the type of information that must be provided to confirm the identity of a device (e.g., the electronic book viewer 102 or the mobile device 104) or the identity of a user. Such credential information may be in the form of a username/password combination or other device-generated or user-provided secret information. In some example implementations, the credential information may simply be an identifier stored in a corresponding entry of the ID column 706 indicating that an electronic book viewer or mobile communication device need only provide the ID stored in the ID column 706 to confirm the identity of the electronic book viewer or mobile communication device.

In example implementations in which content protection and access control is implemented based on user identities, the credential column 708 may store biometric or other user-recognition information user-identification information such as fingerprint minutiae data, facial recognition data, voice recognition data, gesture data (e.g., hand, finger, or stylus movement patterns across a touch panel interface), etc. For example, the electronic book viewer 102 may be provided with credential sensors 710 as shown in FIG. 7. The credential sensors 710 may be digital camera imagers, fingerprint sensors, microphones, etc. The credential sensors 710 may be provided only on the display panels 106a-c, only on the binding 206, or on the display panels 106a-c and the binding 206. In the case of digital camera imagers, the credential sensors 710 may acquire a snapshot of a person actively viewing (or exposed to) a display panel (e.g., one of the display panels 106a-c) and use the snapshot information to determine the identity of the person based on the credential information in the credential column 708. In the case of fingerprint sensors, the credential sensors 710 may acquire fingerprint information for fingerprint matching purposes. In the case of microphones, the credential sensors 710 may collect speech utterances for purposes of performing speaker recognition to identify persons. Enrollment of such biometric or user-recognition information may be performed via the electronic book viewer 102, the mobile device 104, or a home or office computer 712 and communicated to the service provider content server 114 for storing in the credential data structure 702.

In the illustrated example of FIG. 7, the content protection policy data structure 704 includes an ID column 714, a permissions column 716, and a content ID column 718. The ID column 714 is similar to the ID column 706 and can store user IDs for instances in which content protection and access control is implemented based on user identities or device IDs for instances in which content protection and access control is implemented based on device identities. The permissions column 716 stores rules defining the types of protections or access controls to be enforced for corresponding content, and the content ID column 718 stores identifiers of content corresponding to the rules in the permissions column 716. Thus, in the illustrated example of FIG. 7, particular content identified in the content ID column 718 is associated with corresponding rules stored in the permissions column 716 to control access by a device or user identified in ID column 714, and the identity of the user or device identified in the ID column 714 is validated, verified, or confirmed based on credential information specified in a corresponding entry in the credential column 708 of the credential data structure 702.

In some example implementations, credential requirements in the credential column 708 and permissions in the content protection policy data structure 704 may be user-created or user-specified via, for example, the electronic book viewer 102, the mobile device 104, and/or the computer 712. For example, credential information may identify family members of a household, extended family members, friends, co-workers, employees, etc. In this manner, end users may create content protection and access control permissions for family members or friends in a social environment or employees/co-workers in a professional work environment.

In the illustrated examples described herein, the protection policies in the content protection policy data structure 704 may be enforced by electronic book viewers (e.g., the electronic book viewer 102) and/or processor systems in communication with the electronic book viewers such as, for example, the mobile device 104. When enforced by the electronic book viewer 102, the content protection policies may be enforced using the binding processor system 304 and/or display panel sub-systems of the display panels 106a-c (e.g., the display panel sub-system 308 of the display panel 106b of FIG. 3).

The protection policies may be enforced to protect or control access to content when such content is handled or shared using the attachable and detachable capabilities of the removably attachable display panels 106a-c described above in connection with FIG. 2. For example, different protection policies may define different access control protections based on the home attached mode configuration 204a, the tablet mode configuration 204b, and the visiting attached mode configuration 204c of FIG. 2.

Figure 8:
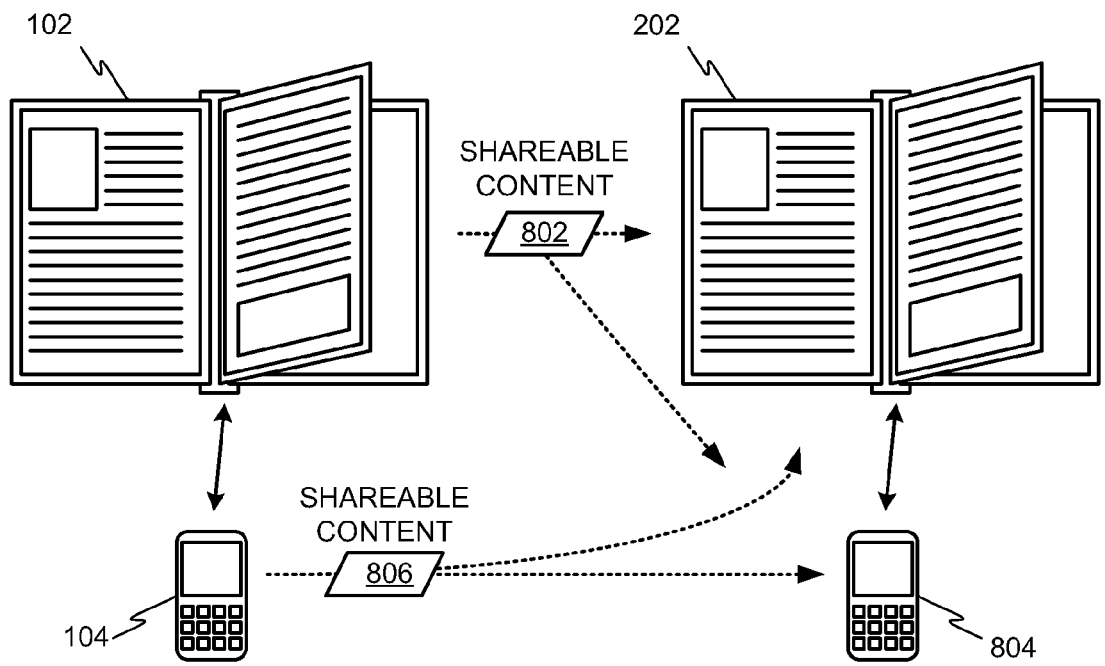
FIG. 8 depicts example manners of communicating content between electronic book viewers, between host devices, and between host devices and electronic book viewers.

Additionally or alternatively, protection policies in the content protection policy data structure 704 may be enforced when content is communicatively transmitted between electronic book viewers and/or processor systems in communication with the electronic book viewers such as, for example, the mobile device 104. For example, as shown in FIG. 8, the electronic book viewer 102 may be configured to analyze and enforce protection policies in the content protection policy data structure 704 and wirelessly send shareable content 802 to the electronic book viewer 202 and/or to another mobile device 804. Similarly, the mobile device 104 may additionally or alternatively analyze and enforce protection policies in the content protection policy data structure 704 and wirelessly send shareable content 806 to the electronic book viewer 202 and/or to the mobile device 804 (or other processor system in communication with and hosting content for the electronic book viewer 202).

Briefly referring back to FIG. 7, the content identified in the content ID column 718 may identify user-authored content, which may include notes, comments, or markups related to another authored work. In this manner, user-authored content may be protected using content protection and access control permissions different from those enforced for underlying original content (e.g., commercially available published works, medical records, legal documents, etc.). For example, turning to FIG. 9, the removably attachable display panel 106b has original content 902 displayed thereon and user-authored content 904 (e.g., user notes) displayed in overlaid fashion on the original content 902. In the illustrated example, the original content 902 and the user-authored content 904 may be represented by two separate identifiers in the ID column 714 of FIG. 7 and are associated with separate content protection policies. For example, a content protection policy for the original content 902 may indicate that the original content 902 is freely distributable or shareable with any person or device, while a content protection policy (e.g., specified by a user) may indicate that the user-authored content 904 can only be displayed on a particular device or devices (e.g., identified by a particular device ID) or can only be displayed to a particular person or persons (e.g., identified based on some biometric or user identifier information specified in the credential column 708 of FIG. 7).

Figure 9:
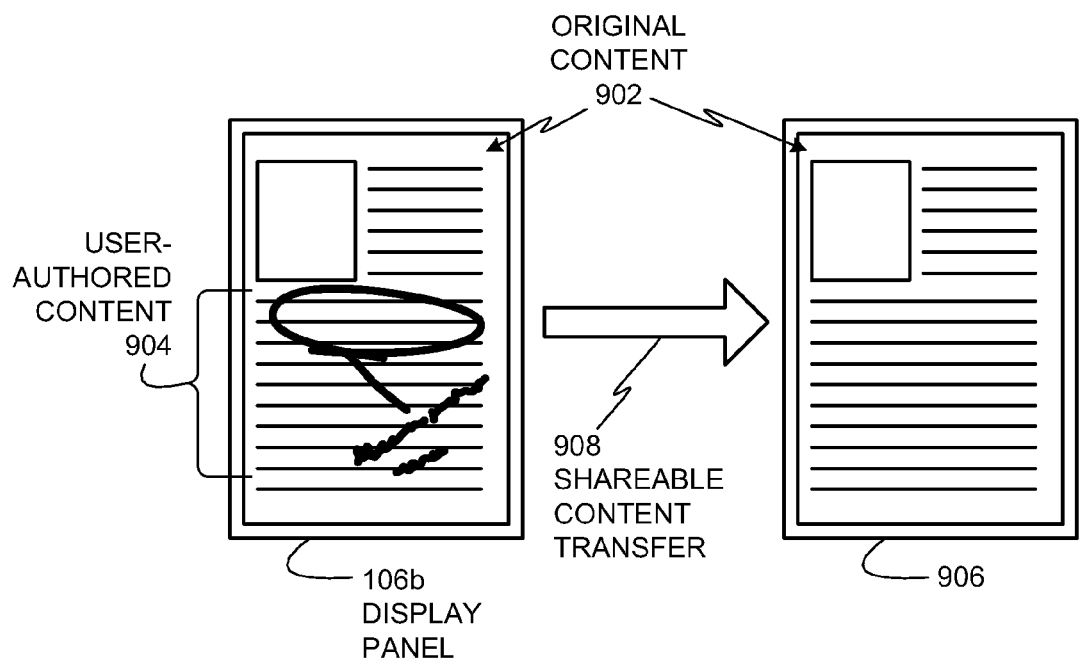
FIG. 9 depicts an example manner of transferring shareable content between electronic book viewers without sharing non-shareable content.

To enforce respective protection policies of the original content 902 and user-authored content 904 during a content transfer or sharing process between two or more electronic book viewers, an electronic book viewer (e.g., the electronic book viewer 102) or an associated mobile communication device (e.g., the mobile device 104) may transfer the shareable content (e.g., the original content 902), while not sharing non-shareable content (e.g., the user-authored content 904). For example, as shown in FIG. 9, the original content 902 is transferred to a display panel 906 of another electronic book viewer during a shareable content transfer session 908, while the user-authored content 904 is omitted from the transfer. Similarly, if the removably attachable display panel 106b is removed from the binding 206 of the electronic book viewer 102 and attached to another binding such as the binding 208 of FIG. 2, the display panel subsystem 308 (FIG. 3) may enforce the content protection policy of the user-authored content 904 to cease the displaying thereof based on, for example, being detached (e.g., in the tablet mode configuration 204b), being attached to another binding (e.g., in the visiting mode configuration 204c), or being viewed by a non-authorized person.

Although FIG. 9 shows the enforcement of a restrictive access control to only the user-authored content 204 in connection with the content transfer session 908, in other example implementations, the electronic book viewer 102 and/or the mobile device 104 may similarly protect access to original content or other content by first determining the types of protection or access control specified for the content prior to responding to a transfer request (e.g., a request to perform the shareable content transfer session 908). If a protection policy specifies that the content requested for transfer cannot be transferred, the electronic book viewer 102 and/or the mobile device 104 may display an explanation of such to a user.

In some example implementations, when the electronic book viewer 102 requests the original content 902 and user-authored content 904 from the mobile device 104, the mobile device 104 may deny the request for both the original content 902 and the user-authored content 904 if the content 902 and 904 is protected from display on the electronic book viewer 102. Alternatively, the mobile device 104 may deny the request only for the user-authored content 904 but not the original content 902 if the mobile device 104 determines that the original content 902 is not protected from display on the electronic book viewer 102, while the user-authored content 904 is protected from display on the electronic book viewer 102.

In addition, although FIG. 9 shows the user-authored content 904 as being non-shareable content, in other example implementations, non-shareable content may be content that is part of the original content 902. For example, if the original content 902 is a person's medical record, the person may specify that a personal identifier (e.g., a social security number) or certain medical history events in the original content not be transferred even though the remainder of the original content 902 is designated as transferable. In such instances, non-transferable information in the original content 902 may appear as redacted or as blank when the original content 902 is rendered on the display panel 906 after the shareable content transfer session 908. In other example implementations associated with, for example, shareable electronic books or publications, a person may indicate to only share a single page, column, paragraph, story, or any other desired portion without sharing an entire electronic book or publication.

Figure 10:
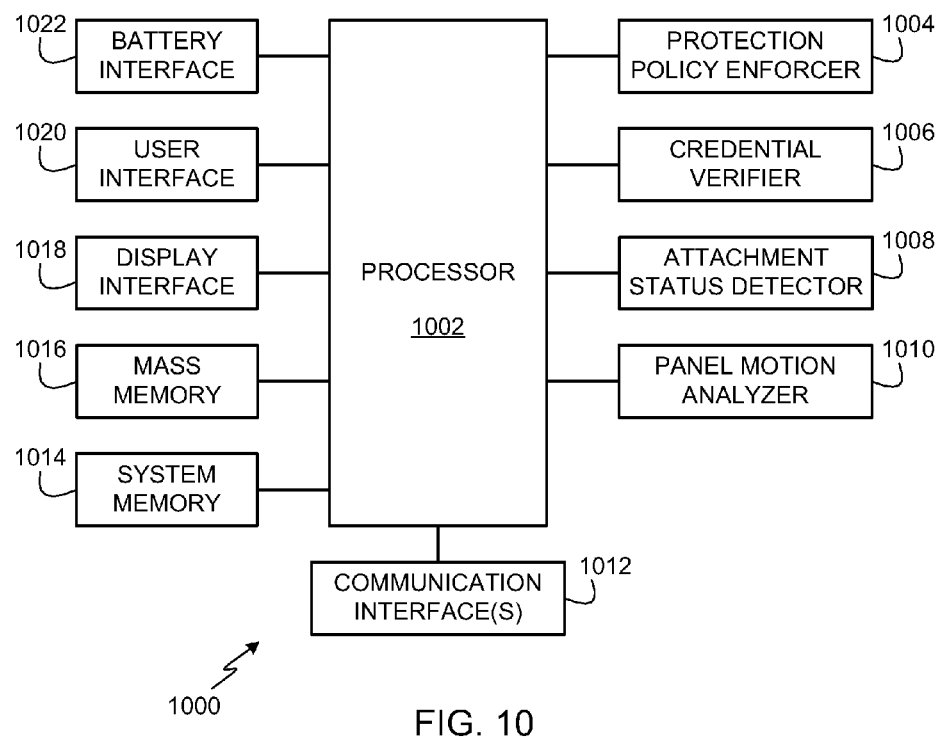
FIG. 10 depicts an example apparatus that may be used to implement the electronic book viewer of FIGS. 1, 2, 3, 5, 7, and 8.

FIG. 10 depicts an example apparatus 1000 that may be used to implement the binding processor system 304 and/or the display panel subsystem 308 of FIG. 3 to implement the electronic book viewer 102 of FIGS. 1, 2, 5, and 7. In some example implementations, some portions of the example apparatus 1000 may also be implemented in the mobile device 104. In the illustrated example, the apparatus 1000 includes a processor 1002 that may be used to control the overall operation of the apparatus 1000. The processor 1002 may be implemented using a controller, a general purpose processor, a digital signal processor, or any combination thereof.

In the illustrated example of FIG. 10, the apparatus 1000 also includes a protection policy enforcer 1004, a credential verifier 1006, an attachment status detector 1008, and a panel motion analyzer 1010. The protection policy enforcer 1004 may be used to analyze and enforce content protection policies (e.g., protection policies stored in the content protection policy data stores 112, 122, 126 of FIG. 1 and the content protection policy data structure 704 of FIG. 7) to protect or control access to content (e.g., content stored in the content data stores 110, 120, and 124 of FIG. 1). The credential verifier 1006 may be used to verify or validate credentials required by the credential requirements stored in the credential data structure 702 of FIG. 7 to confirm identities of users and/or devices. In some example implementations, the protection policy enforcer 1004 and the credential verifier 1006 may additionally or alternatively be implemented in a host device such as the mobile device 104. In this manner, the mobile device 104 can operate as an authorizing device to control/authorize access to content based on content protection policies and credentials (e.g., user and/or device credentials).

The attachment status detector 1008 may be used to detect attached/detached operating modes (e.g., the home attached mode configuration 204a, the tablet mode configuration 204b, and the visiting attached mode configuration 204c of FIG. 2) of the removably attachable display panels 106a-c. The panel motion analyzer 1010 may be used to detect page turns of the removably attachable display panels 106a-c to trigger the presentation of subsequent page content of an electronic book or document in response to a forward page turn event or trigger the presentation of previous page content of an electronic book or document in response to a backward page turn event.

The protection policy enforcer 1004, the credential verifier 1006, the attachment status detector 1008, and the panel motion analyzer 1010 may be implemented using any desired combination of hardware, firmware, and/or software. For example, one or more integrated circuits, discrete semiconductor components, and/or passive electronic components may be used. Thus, for example, the protection policy enforcer 1004, the credential verifier 1006, the attachment status detector 1008, and the panel motion analyzer 1010, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc. The protection policy enforcer 1004, the credential verifier 1006, the attachment status detector 1008, and the panel motion analyzer 1010, or parts thereof, may be implemented using instructions, code, and/or other software and/or firmware, etc. stored on a machine accessible medium and executable by, for example, a processor (e.g., the example processor 1002). When any of the appended claims are read to cover a purely software implementation, at least one of the protection policy enforcer 1004, the credential verifier 1006, the attachment status detector 1008, or the panel motion analyzer 1010 is hereby expressly defined to include a tangible medium such as a solid state memory, a magnetic memory, a DVD, a CD, etc.

The apparatus 1000 is provided with one or more communication subsystem(s) 1012 to enable sending and receiving content and content protection policies. The communication subsystem(s) 1012 may be wired, wireless, or a combination thereof. For example, the binding processor subsystem 304 and the display panel subsystem 308 may be provided with at least one wired communication subsystem (e.g., a serial interface) to enable exchanging information between the binding 206 and the removably attachable display panels 106*a-c*. Alternatively, communications between the binding 206 and the removably attachable display panels 106*a-c* may be performed via wireless communications. The binding processor subsystem 304 and the display panel subsystem 308 may be provided with wireless communication subsystems to communicate with the mobile device 104 (FIGS. 1, 7, and 8). Example wireless communication technologies that may be employed to implement the one or more communication subsystem(s) 1012 include, for example, IEEE® 802.11 radio technology, BLUETOOTH® radio technology, ZIGBEE® radio technology, wireless USB radio technology, and ultra-wideband (UWB) radio technology.

In the illustrated example, the apparatus 1000 is also provided with a system memory 1014 and a mass storage memory 1016. The system memory 1014 may be implemented using a volatile memory such as a random access memory (RAM) and used to store immediately available computer readable instructions and data (e.g., content presentable via the electronic book viewer 102, content protection policies, etc.) to control the operation of the apparatus 1000. The mass storage memory 1016 may be implemented using a non-volatile memory such as a flash memory and may be used as long-term storage of computer readable instructions and/or data (e.g., content presentable via the electronic book viewer 102, content protection policies, etc.).

To enable a user to use and interact with or via the electronic book viewer 102, the apparatus 1000 is provided with a display interface 1018 and a user input interface 1020. The display interface 1018 can be an LCD display interface, an e-paper display interface, an organic light emitting diode (OLED) interface, etc. The user input interface 1020 could be an alphanumeric keyboard and/or telephone-type keypad, a multi-direction actuator or roller wheel with dynamic button pressing capability, a touch panel, individual keys/buttons, etc. In the illustrated example, the apparatus 1000 is a battery-powered device and is, thus, provided with a battery interface 1022 to interface with, for example, the battery 306 and/or the battery 310 of FIG. 3.

Figure 11:
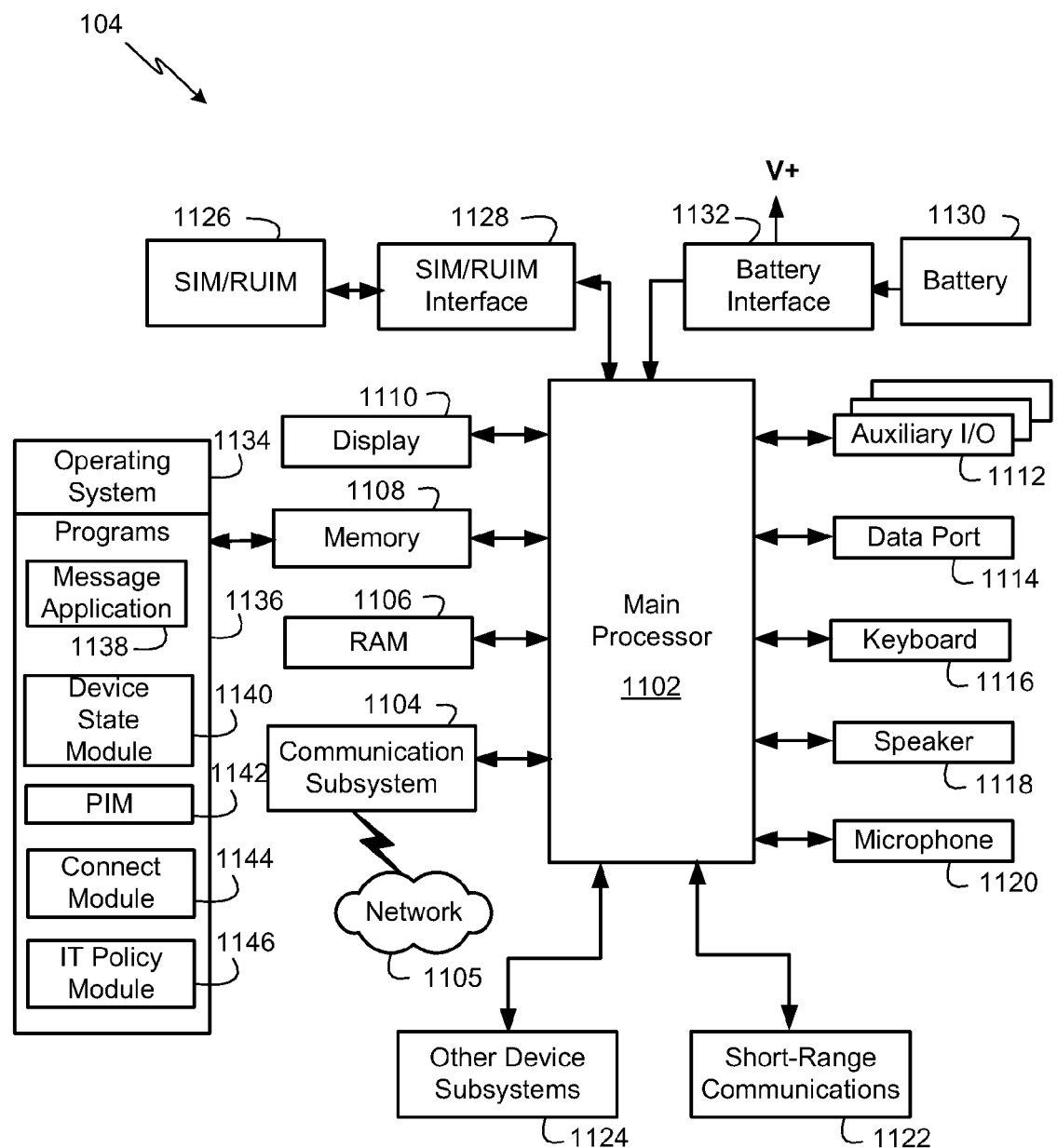
FIG. 11 depicts an example block diagram of the mobile device of FIGS. 1, 7, and 8.

FIG. 11 depicts a block diagram of an example implementation of a processor system that may be used to implement the mobile device 104. In the illustrated example, the mobile device 104 is a two-way communication device with advanced data communication capabilities including the capability to communicate with other mobile devices or computer systems through a network of transceiver stations. The mobile device 104 may also have the capability to allow voice communication. Depending on the functionality provided by the mobile device, it may be referred to as a data messaging device, a two-way pager, a cellular telephone with data messaging capabilities, a smart phone, a wireless Internet appliance, or a data communication device (with or without telephony capabilities). To aid the reader in understanding the structure of the mobile device 104 and how it communicates with other devices and host systems, FIG. 11 will now be described in detail.

Referring first to FIG. 11, the mobile device 104 includes a number of components such as a main processor 1102 that controls the overall operation of the mobile device 104. Communication functions, including data and voice communications, are performed through a communication subsystem 1104. The communication subsystem 1104 receives messages from and sends messages to a wireless network 1105. In the illustrated example of the mobile device 104, the communication subsystem 1104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example implementations described herein are intended to use any other suitable standards that are developed in the future. The wireless link connecting the communication subsystem 1104 with the wireless network 1105 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1105 associated with mobile device 104 is a GSM/GPRS wireless network in one exemplary implementation, other wireless networks may also be associated with the mobile device 104 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, MOBITEX® and DATATAC® network communication systems. Examples of other voice-centric data networks include Personal Communication Systems (PCS) networks like GSM and Time Division Multiple Access (TDMA) systems.

The main processor 1102 also interacts with additional subsystems such as a Random Access Memory (RAM) 1106, a persistent memory 1108 (e.g., a non-volatile memory), a display 1110, an auxiliary input/output (I/O) subsystem 1112, a data port 1114, a keyboard 1116, a speaker 1118, a microphone 1120, short-range communications 1122, and other device subsystems 1124.

Some of the subsystems of the mobile device 104 perform communication-related functions, whereas other subsystems may provide "resident" or on-device functions. By way of example, the display 1110 and the keyboard 1116 may be used for both communication-related functions, such as entering a text message for transmission over the network 1105, and device-resident functions such as a calculator or task list.

The mobile device 104 can send and receive communication signals over the wireless network 1105 after required network registration or activation procedures have been completed. Network access is associated with a subscriber or user of the mobile device 104. To identify a subscriber, the mobile device 104 requires a SIM/RUIM card 1126 (i.e. Subscriber Identity Module or a Removable User Identity Module) to be inserted into a SIM/RUIM interface 1128 in order to communicate with a network. The SIM card or RUIM 1126 is one type of a conventional "smart card" that can be used to identify a subscriber of the mobile device 104 and to personalize the mobile device 104, among other things. Without the SIM card 1126, the mobile device 104 is not fully operational for communication with the wireless network 1105. By inserting the SIM card/RUIM 1126 into the SIM/RUIM interface 1128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation, content presentation via the electronic book viewer 102 (FIGS. 1, 2, 5, 7, and 8). The SIM card/RUIM 1126 includes a processor and memory for storing information. Once the SIM card/RUIM 1126 is inserted into the SIM/RUIM interface 1128, it is coupled to the main processor 1102. In order to identify the subscriber, the SIM card/RUIM 1126 can include some user parameters such as an International Mobile Subscriber Identity (IMSI). An advantage of using the SIM card/RUIM 1126 is that a subscriber is not necessarily bound by any single physical mobile device. The SIM card/RUIM 1126 may store additional subscriber information for a mobile device as well, including datebook (or calendar) information and recent call information. Alternatively, user identification information can also be programmed into the persistent memory 1108.

The mobile device 104 is a battery-powered device and includes a battery interface 1132 for receiving one or more rechargeable batteries 1130. In at least some embodiments, the battery 1130 can be a smart battery with an embedded microprocessor. The battery interface 1132 is coupled to a regulator (not shown), which assists the battery 1130 in providing power V+ to the mobile device 104. Although current technology makes use of a battery, future technologies such as micro fuel cells may provide the power to the mobile device 104.

The mobile device 104 also includes an operating system 1134 and software components 1136 to 1146 which are described in more detail below. The operating system 1134 and the software components 1136 to 1146 that are executed by the main processor 1102 are typically stored in a persistent store such as the persistent memory 1108, which may alternatively be a read-only memory (ROM) or similar storage element (not shown). Those skilled in the art will appreciate that portions of the operating system 1134 and the software components 1136 to 1146, such as specific device applications, or parts thereof, may be temporarily loaded into a volatile store such as the RAM 1106. Other software components can also be included, as is well known to those skilled in the art.

The subset of software applications 1136 that control basic device operations, including data and voice communication applications, will normally be installed on the mobile device 104 during its manufacture. Other software applications include a message application 1138 that can be any suitable software program that allows a user of the mobile device 104 to send and receive electronic messages. Various alternatives exist for the message application 1138 as is well known to those skilled in the art. Messages that have been sent or received by the user are typically stored in the persistent memory 1108 of the mobile device 104 or some other suitable storage element in the mobile device 104. In at least some embodiments, some of the sent and received messages may be stored remotely from the mobile device 104 such as in a data store of an associated host system that the mobile device 104 communicates with.

The software applications can further include a device state module 1140, a Personal Information Manager (PIM) 1142, and other suitable modules (not shown). The device state module 1140 provides persistence (i.e., the device state module 1140 ensures that important device data is stored in persistent memory, such as the persistent memory 1108, so that the data is not lost when the mobile device 104 is turned off or loses power).

The PIM 1142 includes functionality for organizing and managing data items of interest to the user, such as, but not limited to, e-mail, contacts, calendar events, voice mails, appointments, and task items. A PIM application has the ability to send and receive data items via the wireless network 1105. PIM data items may be seamlessly integrated, synchronized, and updated via the wireless network 1105 with the mobile device subscriber's corresponding data items stored and/or associated with a host computer system. This functionality creates a mirrored host computer on the mobile device 104 with respect to such items. This can be particularly advantageous when the host computer system is the mobile device subscriber's office computer system.

The mobile device 104 also includes a connect module 1144, and an IT policy module 1146. The connect module 1144 implements the communication protocols that are required for the mobile device 104 to communicate with the wireless infrastructure and any host system, such as an enterprise system, that the mobile device 104 is authorized to interface with.

The connect module 1144 includes a set of APIs that can be integrated with the mobile device 104 to allow the mobile device 104 to use any number of services associated with the enterprise system. The connect module 1144 allows the mobile device 104 to establish an end-to-end secure, authenticated communication pipe with the host system. A subset of applications for which access is provided by the connect module 1144 can be used to pass IT policy commands from the host system (e.g., from the IT policy server 128 (FIG. 1) of a host system) to the mobile device 104. This can be done in a wireless or wired manner. These instructions can then be passed to the IT policy module 1146 to modify the configuration of the mobile device 104 and/or the electronic book viewer 102. Alternatively, in some cases, the IT policy update can also be done over a wired connection.

The IT policy module 1146 receives IT policy data that encodes the IT policy. The IT policy module 1146 then ensures that the IT policy data is authenticated by the mobile device 104. The IT policy data can then be stored in the flash memory 1106 in its native form. After the IT policy data is stored, a global notification can be sent by the IT policy module 1146 to all of the applications residing on the mobile device 104. Applications for which the IT policy may be applicable then respond by reading the IT policy data to look for IT policy rules that are applicable.

The IT policy module 1146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 1146 can determine which applications (e.g., a media content application for communicating with the electronic book viewer 102 of FIGS. 1, 2, 5, 7, and 8) are affected by the IT policy data and send a notification to only those applications. In either of these cases, for applications that aren't running at the time of the notification, the applications can call the parser or the IT policy module 1146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 1146 sends an acknowledgement back to the host system to indicate that the IT policy data was received and successfully applied.

Other types of software applications can also be installed on the mobile device 104. These software applications can be third party applications, which are added after the manufacture of the mobile device 104. Examples of third party applications include games, calculators, utilities, etc.

The additional applications can be loaded onto the mobile device 104 through at least one of the wireless network 1105, the auxiliary I/O subsystem 1112, the data port 1114, the short-range communications subsystem 1122, or any other suitable device subsystem 1124. This flexibility in application installation increases the functionality of the mobile device 104 and may provide enhanced on-device functions, communication-related functions, or both. For example, secure communication applications may enable electronic commerce functions and other such financial transactions to be performed using the mobile device 104.

The data port 1114 enables a subscriber to set preferences through an external device or software application and extends the capabilities of the mobile device 104 by providing for information or software downloads to the mobile device 104 other than through a wireless communication network. The alternate download path may, for example, be used to load an encryption key onto the mobile device 104 through a direct and thus reliable and trusted connection to provide secure device communication.

The data port 1114 can be any suitable port that enables data communication between the mobile device 104 and another computing device. The data port 1114 can be a serial or a parallel port. In some instances, the data port 1114 can be a USB port that includes data lines for data transfer and a supply line that can provide a charging current to charge the battery 1130 of the mobile device 104.

The short-range communications subsystem 1122 provides for communication between the mobile device 104 and different systems or devices, without the use of the wireless network 1105. For example, the subsystem 1122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, web page download, media content for presenting via the electronic book viewer 102 (FIGS. 1, 2, 3, 5, 7, and 8) will be processed by the communication subsystem 1104 and input to the main processor 1102. The main processor 1102 will then process the received signal for output to the display 1110 (or a display of the electronic book viewer 102) or alternatively to the auxiliary I/O subsystem 1112. A subscriber may also compose data items, such as e-mail messages, for example, using the keyboard 1116 in conjunction with the display 1110 and possibly the auxiliary I/O subsystem 1112. The auxiliary subsystem 1112 may include devices such as: a touch screen, mouse, track ball, infrared fingerprint detector, or a roller wheel with dynamic button pressing capability. The keyboard 1116 is preferably an alphanumeric keyboard and/or telephone-type keypad. However, other types of keyboards may also be used. A composed item may be transmitted over the wireless network 1105 through the communication subsystem 1104.

For voice communications, the overall operation of the mobile device 104 is substantially similar, except that the received signals are output to the speaker 1118, and signals for transmission are generated by the microphone 1120. Alternative voice or audio I/O subsystems, such as a voice message recording subsystem, can also be implemented on the mobile device 104. Although voice or audio signal output is accomplished primarily through the speaker 1118, the display 1110 can also be used to provide additional information such as the identity of a calling party, duration of a voice call, or other voice call related information.

Figure 12:
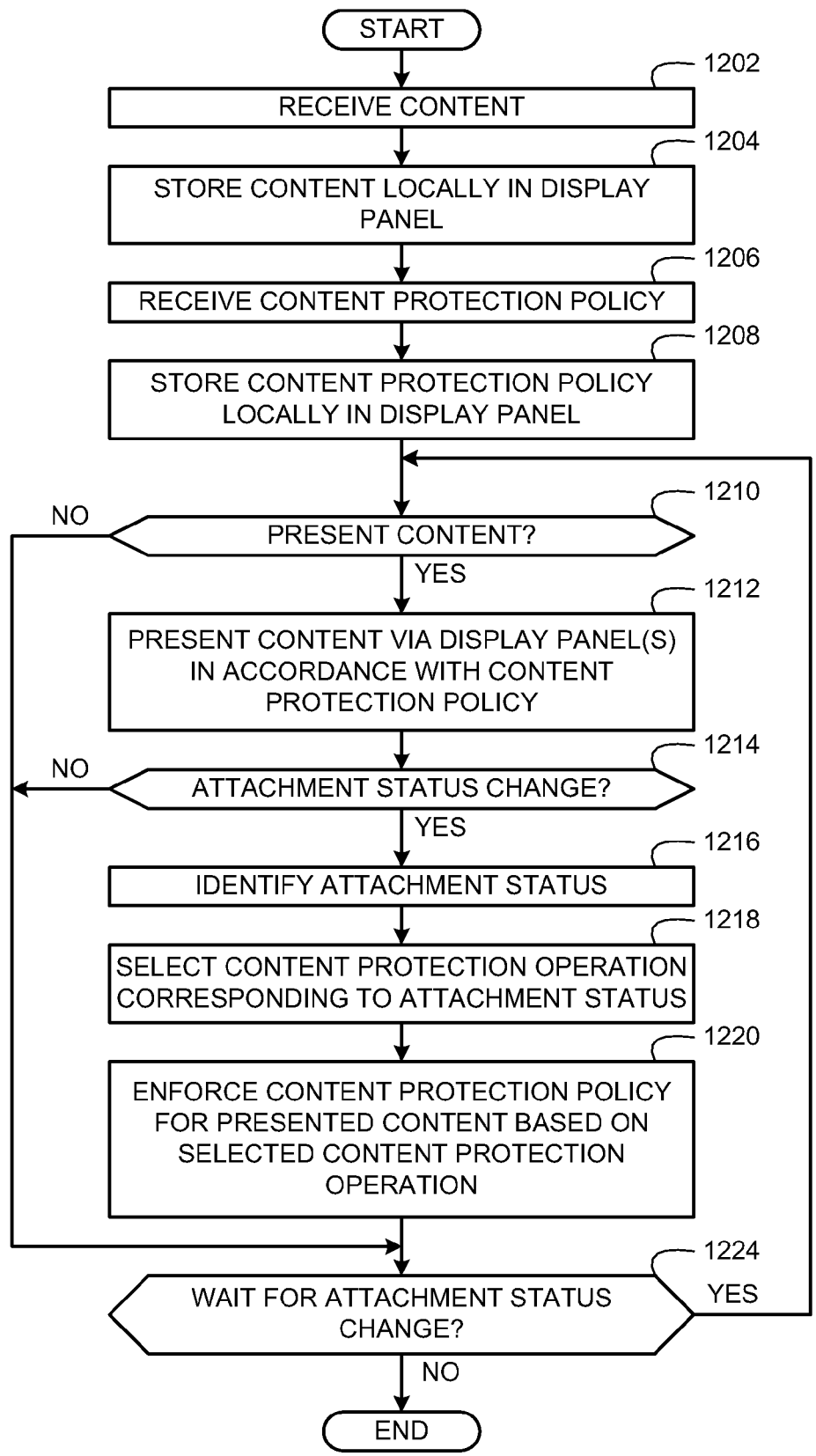
FIG. 12 depicts an example flow diagram representative of computer readable instructions that may be used to display content on the electronic book viewer in accordance with content protection policies.
Figure 13:
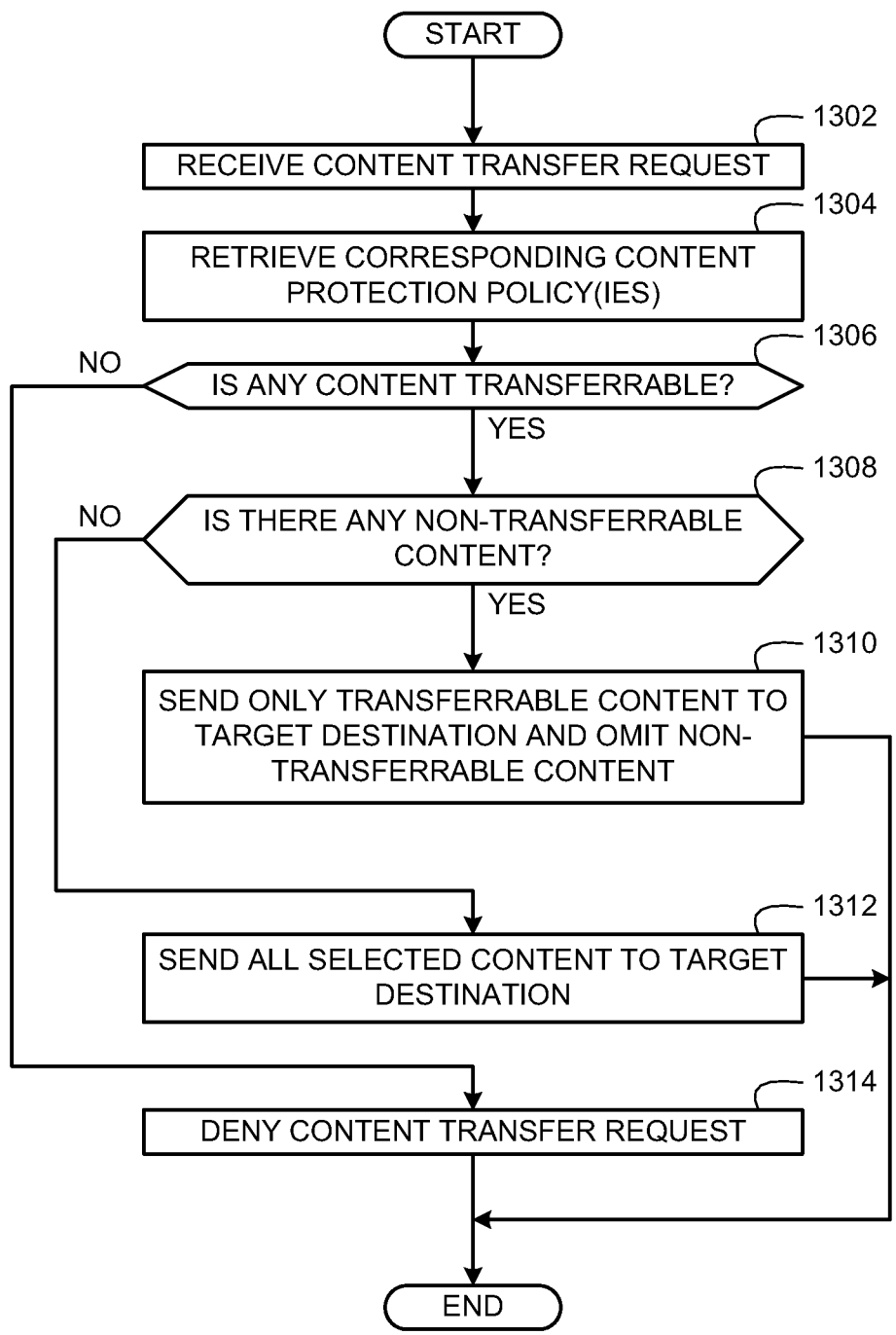
FIG. 13 depicts an example flow diagram representative of computer readable instructions that may be used to transfer content between electronic book readers and/or host devices in accordance with content protection policies.

FIGS. 12 and 13 depict example flow diagrams representative of processes that may be implemented using, for example, computer readable instructions that may be used to display content on the electronic book viewer in accordance with content protection policies and to transfer content between electronic book readers and/or host devices in accordance with content protection policies. The example processes of FIGS. 12 and 13 may be performed using one or more processors, controllers, and/or any other suitable processing devices. For example, the example processes of FIGS. 12 and 13 may be implemented using coded instructions (e.g., computer readable instructions) stored on one or more tangible computer readable media such as flash memory, read-only memory (ROM), and/or random-access memory (RAM). As used herein, the term tangible computer readable medium is expressly defined to include any type of computer readable storage and to exclude propagating signals. Additionally or alternatively, the example processes of FIGS. 12 and 13 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 12 and 13 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 12 and 13 may be implemented manually or as any combination(s) of any of the foregoing techniques, for example, any combination of firmware, software, discrete logic and/or hardware. Further, although the example processes of FIGS. 12 and 13 are described with reference to the flow diagrams of FIGS. 12 and 13, other methods of implementing the processes of FIGS. 12 and 13 may be employed. For example, the order of execution of the blocks may be changed, and/or some of the blocks described may be changed, eliminated, subdivided, or combined. Additionally, any or all of the example processes of FIGS. 12 and 13 may be performed sequentially and/or in parallel by, for example, separate processing threads, processors, devices, discrete logic, circuits, etc.

Now turning to FIG. 12, the depicted flow diagram is representative of an example process that may be used to display content on the electronic book viewer in accordance with content protection policies. The example process is described below as being performed by the electronic book viewer 102 as implemented using the apparatus 1000 of FIG. 10. However, the example process may alternatively be performed by the mobile device 104 while in communication with the electronic book viewer 102 and controlling operations of the electronic book viewer 102. For example, the mobile device 104 may communicate wirelessly with the binding 206 (FIG. 2) and/or with each of the removably attachable display panels 106a-c to detect attachable/detachable status thereof and control/authorize presentation of content thereby.

Initially, the electronic book viewer 102 receives content (block 1202) via, for example, the communication interface 1012 of FIG. 10. For example, the electronic book viewer 102 may receive content from any of the content data stores 110, 120, and 124 of FIG. 1 via the mobile device 104. The electronic book viewer 102 stores the content locally in one or more of the display panels 106a-c of FIGS. 1, 2, 5, and 6 (block 1204). For example, the electronic book viewer 102 can store the content in the system memory 1014 or the mass memory 1016 (FIG. 10). The electronic book viewer 102 receives a corresponding content protection policy (block 1206) via, for example, the communication interface 1012. For example, the electronic book viewer 102 may receive content from any of the content protection policy data stores 112, 122, and 126 of FIG. 1 via the mobile device 104. The electronic book viewer 102 stores the content protection policy locally in one or more of the display panels 106a-c having corresponding content stored therein (block 1208). For example, the electronic book viewer 102 can store the content protection policy in the system memory 1014 or the mass memory 1016.

The electronic book viewer 102 then uses the protection policy enforcer 1004 to determine whether the received content can be presented based on its corresponding content protection policy (block 1210). For example, the protection policy enforcer 1004 may determine whether the content protection policy allows the content to be presented on the electronic book viewer 102 based on, for example, a credential (e.g., a user ID, a device ID, etc.), an access control rule (e.g., date/time, duration, payment, etc.), or any other access control criteria. In some example implementations, the credential verifier 1006 (FIG. 10) may be invoked to verify the identity of a user and/or a device as discussed above and communicate a verification statement to the protection policy enforcer 1004 for use in enforcing the received content protection policy. In some example implementations, content protection policies may specify that corresponding content may be presented only when an electronic book viewer is within communication range of a host device (e.g., the mobile device 104) and/or in communication with a service provider network of the host device. Some content protection policies may specify that a service policy from, for example, the IT policy server 128 of FIG. 1 allows or authorizes the content to be displayed on the electronic book viewer 102 (e.g., the content is not protected from being displayed on the electronic book viewer 102).

In any case, if the protection policy enforcer 1004 determines that the content may be presented (block 1210), the electronic book viewer 102 presents the content via one or more of the removably attachable display panels 106a-c (block 1212).

The attachment status detector 1008 (FIG. 10) (in the binding 206 or in each of the display panels 106a-c) determines whether a display panel attachment status has changed (block 1214) for any of the display panels 106a-c. For example, the attachment status may be indicative of a display panel 106a-c being in the home attached mode configuration 204a, the tablet mode configuration 204b, or the visiting attached mode configuration 204c of FIG. 2. If the display panel attachment status has changed (block 1214), the attachment status detector 1008 identifies the attachment status of one of the display panels 106a-c associated with the attachment status change (block 1216). The protection policy enforcer 1004 selects a content protection operation (e.g., a rule, provision, or restriction from the content protection policy received at block 1206) corresponding to the identified attachment status (block 1218) and enforces the content protection policy for the presented content based on the selected content protection operation (block 1220). For example, the content protection operation may indicate that the content should be removed immediately or after a specified duration in response to the attachment status change. Alternatively, the content protection operation may indicate that the content can remain displayed while the display panel 106a-c is in the identified attachment status.

After enforcing the content protection policy (block 1220) or if the attachment status has not changed (block 1214) or if the content is not to be presented (block 1210), the electronic book viewer 102 (or the display panels 106a-c) determines whether it should continue to wait for an attachment status change (or another attachment status change) (block 1224). If the electronic book viewer 102 determines that it should continue to wait for an attachment status change (e.g., the content remains displayed) (block 1224) control returns to block 1210. At block 1210, the protection policy enforcer 1004 can re-evaluate whether it should continue to present the content or present content that was not previously presentable. For example, the protection policy enforcer 1004 may determine that content should no longer be presented when any criteria or rule associated with a corresponding protection policy is being violated (e.g., a duration has expired, a date/time has passed, the electronic book viewer 102 is no longer within communication range of the mobile device 104 and/or is no longer in communication with a service provider network, a user or device credential is no longer present or valid, etc.).

If the electronic book viewer 102 determines that it should no longer wait for an attachment status change (block 1224) (e.g., content is no longer being displayed and/or the electronic book viewer 102 has been powered off), the example process of FIG. 12 is ended.

Now turning to FIG. 13, the depicted flow diagram is representative of an example process that may be used to transfer content between electronic book viewers and/or host devices (e.g., the mobile devices 104 and 804 shown in FIG. 8) in accordance with content protection policies. Although the example process is described as being performed by the electronic book reader 102 as implemented using the example apparatus 1000 of FIG. 10, the example process may instead be performed by a host device such as the mobile device 102 as described above in connection with FIG. 8. Initially, the electronic book reader 102 receives a content transfer request (block 1302). The content transfer request may request to transfer one or more content instances associated with the same or different content protection policies. The protection policy enforcer 1004 retrieves one or more corresponding content protection policies (block 1304) and determines whether any of the content requested for transfer is transferable (e.g., shareable) (block 1306). For example, the one or more retrieved content protection policies may indicate that some of the content requested for transfer is shareable with others (e.g., not protected from displaying on an electronic book viewer of a target recipient), while one or more of the content protection policies may indicate that some of the content is not shareable with anyone (e.g., protected from displaying on an electronic book viewer of a target recipient). For example, in the example of FIG. 9, the original content 902 may be shareable, while the user-authored content 904 may not be shareable. In some example implementations, only certain portions of the original content 902 may be shareable while other portions are not and must be omitted from a content transfer (e.g., the shareable content transfer session 908 of FIG. 9). In yet other example implementations, determining whether the requested content may be transferred involves confirming that a service policy from, for example, the IT policy server 128 of FIG. 1 protects the content from being displayed on an electronic book viewer of a target recipient.

If there is at least some transferable content (block 1306), the protection policy enforcer 1004 determines whether any of the content is non-transferable (i.e., not shareable). If there is any content that is non-transferable (block 1308), the electronic book viewer 102 sends only the transferable content identified at block 1306 to a target destination (e.g., to the electronic book viewer 202 of FIGS. 2 and 8 or to the mobile device 804 of FIG. 8) and omits the non-transferable content identified at block 1308 (block 1310). However, if the electronic book viewer 102 determines that none of the content requested for transfer is non-transferable (block 1308), the electronic book viewer 102 sends all of the selected content to the target destination (block 1312). Alternatively, if the electronic book viewer 102 determines that none of the content requested for transfer is transferable (block 1306), the electronic book viewer 102 denies the content transfer request (block 1314) by, for example, presenting a message via one of the removably attachable display panels 106a-c.

After denying the content transfer request (block 1314) or after sending only the transferable content to the target destination (block 1310) or after sending all of the selected content to the target destination (block 1312), the example process of FIG. 13 is ended.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
presenting content on a display panel removably attachable to a binding element, the binding element configured to receive one or more other display panels in a removably attached configuration to form an electronic book; and
enforcing a content protection policy associated with the content presented on the display panel, based on an attachment status of the display panel and comprising obtaining identification information of a user via an input interface, identifying the user based on the identification information and enforcing the policy based on the identified user, the attachment status being associated with the removable attachability of the display panel relative to the binding element, wherein enforcing the content protection policy comprises ceasing presentation of at least a portion of the content on the display panel in response to detecting removal of the display panel from the binding element.

2. A method as defined in claim 1, further comprising:
detecting a change in the attachment status of the display panel; and
enforcing the content protection policy associated with the content presented on the display panel based on detecting the change in the attachment status.

3. A method as defined in claim 1, further comprising:
prior to presenting the content on the display panel, receiving the content in the display panel from the binding element and storing the content in a memory of the display panel; and
prior to enforcing the content protection policy, receiving the content protection policy in the display panel from the binding element and storing the content protection policy in the memory of the display panel.

4. A method as defined in claim 1, wherein enforcing the content protection policy comprises, after removal of the display panel from the binding element, continuing to present the content on the display panel for a duration corresponding to the content protection policy, and ceasing presentation of the content on the display panel after expiration of the duration in accordance with the content protection policy.

5. A method as defined in claim 1, wherein enforcing the content protection policy comprises, after removal of the display panel from the binding element, and in response to detecting an attachment of the display panel to another binding element, enforcing a rule of the content protection policy associated with the attachment to the other binding element.

6. A method as defined in claim 1, wherein identifying the user based on the identification information comprises performing a biometric recognition process on the identification information.

7. A method as defined in claim 1, wherein the input interface is a sensor on the display panel.

8. An apparatus comprising:
a processor; and
a memory in communication with the processor having instructions stored thereon that, when executed, cause the processor to:
present content on a display panel removably attachable to a binding element, the binding element configured to receive one or more other display panels in a removably attached configuration to form an electronic book; and
enforce a content protection policy associated with the content presented on the display panel, based on an attachment status of the display panel and comprising obtaining identification information of a user via an input interface, identifying the user based on the identification information and enforcing the policy based on the identified user, the attachment status being associated with the removable attachability of the display panel relative to the binding element, wherein enforcing the content protection policy comprises ceasing presentation of at least a portion of the content on the display panel in response to detecting removal of the display panel from the binding element.

9. An apparatus as defined in claim 8, wherein the instructions, when executed, further cause the processor to:
   detect a change in the attachment status of the display panel; and
   enforce the content protection policy associated with the content presented on the display panel based on detecting the change in the attachment status.

10. An apparatus as defined in claim 8, wherein the instructions, when executed, further cause the processor to:
    prior to presenting the content on the display panel, receive the content in the display panel from the binding element and store the content in a memory of the display panel; and
    prior to enforcing the content protection policy, receive the content protection policy in the display panel from the binding element and store the content protection policy in the memory of the display panel.

11. An apparatus as defined in claim 8, wherein the instructions, when executed, further cause the processor to enforce the content protection policy by, after removal of the display panel from the binding element, continuing to present the content on the display panel for a duration corresponding to the content protection policy, and ceasing presentation of the content on the display panel after expiration of the duration in accordance with the content protection policy.

12. An apparatus as defined in claim 8, wherein the instructions, when executed, further cause the processor to enforce the content protection policy by, after removal of the display panel from the binding element, and in response to detecting an attachment of the display panel to another binding element, enforcing a rule of the content protection policy associated with the attachment to the other binding element.

13. An apparatus as defined in claim 8, wherein identifying the user based on the identification information comprises performing a biometric recognition process on the identification information.

14. An apparatus as defined in claim 8, wherein the input interface is a sensor on the display panel.

15. A method comprising:
    receiving a request at a processor system to provide content for display on an electronic book viewer device having first and second removably attachable display panels, the processor system being a host of the electronic book viewer device and separate from the electronic book viewer device, and the processor system to store content and corresponding content protection policies;
    determining, based on a content protection policy of the content, whether the content is protected from display on the electronic book viewer device based on obtaining identification information of a user via an input interface, identifying the user based on the identification information and enforcing the policy based on the identified user; and
    when the content is not protected from display on the electronic book viewer device, providing the content and enforcing the content protection policy by ceasing presentation of at least a portion of the content on one of the first or second removably attachable display panels in response to detecting removal of the one of the first or second removably attachable display panels.

16. A method as defined in claim 15, wherein the processor system is a mobile phone.

17. A method as defined in claim 15, further comprising, when only the portion of the content is not protected from display on the electronic book viewer device, providing only the portion of the content.

18. A method as defined in claim 17, wherein the portion of the content is original content and a non-shareable portion of the content is user-authored content associated with the original content.

19. A method as defined in claim 15, wherein determining whether the content is protected from display on the electronic book viewer device comprises verifying that a service provider of the processor system authorizes the electronic book viewer device to display the content.

20. A method as defined in claim 15, wherein determining whether the content is protected from display on the electronic book viewer device further comprises verifying a device identity associated with the electronic book viewer device, and when the device identity satisfies a required credential associated with the content protection policy, determining that the content is not protected from displaying on the electronic book viewer device.

21. An apparatus comprising:
    a processor system; and
    a memory in communication with the processor system having instructions stored thereon that, when executed, cause the processor system to:
      receive a request to provide content for display on an electronic book viewer device having first and second removably attachable display panels, the processor system being a host of the electronic book viewer device and separate from the electronic book viewer device, and the processor system to store content and corresponding content protection policies;
      determine, based on a content protection policy of the content, whether the content is protected from display on the electronic book viewer device based on obtaining identification information of a user via an input interface, identifying the user based on the identification information and enforcing the policy based on the identified user; and
      when the content is not protected from display on the electronic book viewer device, provide the content and enforce the content protection policy by ceasing presentation of at least a portion of the content on one of the first or second removably attachable display panels in response to detecting removal of the one of the first or second removably attachable display panels.

22. An apparatus as defined in claim 21, wherein the processor system is a mobile phone.

23. An apparatus as defined in claim 21, wherein the instructions, when executed, further cause the processor system to, when only the portion of the content is not protected from display on the electronic book viewer device, provide only the portion of the content.

24. An apparatus as defined in claim 23, wherein the portion of the content is original content and a non-shareable portion of the content is user-authored content associated with the original content.

25. An apparatus as defined in claim 21, wherein the instructions, when executed, further cause the processor system to determine whether the content is protected from display on the electronic book viewer device by verifying that a service provider of the processor system authorizes the electronic book viewer device to display the content.

26. An apparatus as defined in claim 21, wherein the instructions, when executed, further cause the processor system to determine whether the content is protected from display on the electronic book viewer device by verifying a device identity associated with the electronic book viewer device, and when the device identity satisfies a required credential associated with the content protection policy, determine that the content is not protected from displaying on the electronic book viewer device.

* * * * *